US012076696B2

(12) United States Patent
Shibata et al.

(10) Patent No.: US 12,076,696 B2
(45) **Date of Patent: *Sep. 3, 2024**

(54) BUBBLE GENERATING DEVICE

(71) Applicant: Shibata Corporation, Aichi (JP)

(72) Inventors: Yoshiki Shibata, Aichi (JP); Kouji Hanamura, Aichi (JP); Yoshitaka Sakamoto, Aichi (JP)

(73) Assignee: Shibata Corporation, Kitanagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,030

(22) Filed: Aug. 3, 2023

(65) Prior Publication Data

US 2023/0372882 A1 Nov. 23, 2023

Related U.S. Application Data

(63) Continuation of application No. 17/363,686, filed on Jun. 30, 2021, now Pat. No. 11,794,152, which is a (Continued)

(30) Foreign Application Priority Data

Jul. 25, 2016 (JP) ................................ 2016-145587

(51) Int. Cl.
*B01F 23/00* (2022.01)
*B01F 23/20* (2022.01)
(Continued)

(52) U.S. Cl.
CPC ........ *B01F 23/23105* (2022.01); *B01F 23/20* (2022.01); *B01F 25/40* (2022.01); (Continued)

(58) Field of Classification Search
CPC .... B01F 23/23105; B01F 23/20; B01F 25/40; B01F 25/4323; B01F 25/4316; B01F 23/23112; B01F 25/4335; F15D 1/025
See application file for complete search history.

(56) References Cited

U.S. PATENT DOCUMENTS

| | | |
|---|---|---|
| 6,042,089 A | 3/2000 | Klein |
| 9,016,928 B1 | 4/2015 | England et al. |

(Continued)

FOREIGN PATENT DOCUMENTS

| | | |
|---|---|---|
| JP | 08-131800 A | 5/1996 |
| JP | 11-014035 A | 1/1999 |

(Continued)

OTHER PUBLICATIONS

U.S. Appl. No. 17/363,686, filed Jun. 30, 2021, applicant Shibata Corporation. Per MPEP 609.07.

*Primary Examiner* — Anshu Bhatia
(74) *Attorney, Agent, or Firm* — Polson Intellectual Property Law P.C.; Margaret Polson; Christopher Sylvain

(57) ABSTRACT

The purpose of the present disclosure is, in a bubble generating device provided with a bubble generating unit for generating minute bubbles in water flowing through the inside of the cylindrical main body unit, to improve the bubble generating efficiency of the bubble generating unit. Provided is a bubble generating device provided with a cylindrical main body unit and a bubble generating unit disposed within the main body, wherein: the bubble generating unit is provided with slits extending radially centered on one point within the main body unit in a cross-sectional plane of the main body unit, and a column part protruding from the inner peripheral surface of main body unit and formed on the peripheral edge of the slits; and the amount of protrusion of the column part is gradually reduced toward the upstream side from the peripheral edges of the slits, and the column part has a recessed part formed on the downstream surface.

20 Claims, 19 Drawing Sheets

Related U.S. Application Data continuation of application No. 16/301,890, filed as application No. PCT/JP2017/026902 on Jul. 25, 2017, now Pat. No. 11,077,411.

(51) Int. Cl.

| | |
|---|---|
| ***B01F 23/231*** | (2022.01) |
| ***B01F 25/40*** | (2022.01) |
| *B01F 25/431* | (2022.01) |
| *B01F 25/432* | (2022.01) |
| *B01F 25/433* | (2022.01) |
| *F15D 1/02* | (2006.01) |

(52) U.S. Cl.

CPC ..... *B01F 23/23112* (2022.01); *B01F 25/4316* (2022.01); *B01F 25/4323* (2022.01); *B01F 25/4335* (2022.01); *F15D 1/025* (2013.01)

(56) References Cited

U.S. PATENT DOCUMENTS

| | | | | |
|---|---|---|---|---|
| 9,046,115 | B1 | 6/2015 | England et al. | |
| 11,077,411 | B2 * | 8/2021 | Shibata | B01F 25/40 |
| 2007/0045198 | A1 | 3/2007 | Sugiura | |

FOREIGN PATENT DOCUMENTS

| | | | |
|---|---|---|---|
| JP | 2002102809 | A | 4/2002 |
| JP | 2004057936 | A | 2/2004 |
| JP | 2008-018330 | A | 1/2008 |
| JP | 2015089533 | A | 5/2015 |
| JP | 5712292 | B2 | 7/2015 |
| JP | 6077627 | B1 | 8/2017 |
| WO | 2008139728 | A1 | 11/2008 |
| WO | 2013012069 | A1 | 1/2013 |
| WO | 2018021330 | A1 | 2/2018 |

* cited by examiner

BUBBLE GENERATING DEVICE

TECHNICAL FIELD

The present disclosure relates to a bubble generator that generates microbubbles of the order of nanometers in water.

BACKGROUND

A cavitation effect is used as one of methods for generating microbubbles. Previous embodiments disclose a bubble generator in which a plurality of screws (columns) project into an orifice of a tubular main body such that microbubbles are generated in a water flow passing through the orifice.

When tap water is introduced into the bubble generator, a flow of the tap water is restricted by a restrictor formed between the opposing screws so that the flow velocity of the tap water increases. As a result, a vacuum area is created downstream from the restrictor according to Bernoulli's principle, and gases dissolved in the water are released due to a cavitation effect (effect of reduced pressure) so that microbubbles are generated.

Also refer to Patent Literatures 2 and 3 that disclose inventions related to the present disclosure.

SUMMARY

Bubble generators are recently required to have higher microbubble generating efficiency. Proceeding from the foregoing, an aspect of the present disclosure is to provide a bubble generator including a tubular main body and a bubble generating part that generates microbubbles in a water flow passing through an inside of the main body, and to improve the bubble generating efficiency of the bubble generating part.

Through extensive research the present disclosure achieved a bubble generator according to a first aspect of the present embodiment having the following structure. More specifically, the first aspect of the present disclosure is directed to a bubble generator including: a tubular main body; and a bubble generating part provided in the main body, wherein the bubble generating part includes a plurality of slits that extend radially from a center that is a point on a cross section of the main body, a plurality of columns that protrude from an inner peripheral surface of the main body to form a periphery of the slits, an amount of protrusion of the columns gradually reduces from the periphery of the slits toward an upstream side, and a recess provided in a downstream-side surface of each of the columns.

In the bubble generator according to the first aspect of the present disclosure as defined above, since the amount of protrusion of the columns gradually reduces from the periphery of the slits toward the upstream side, that is, the columns gradually protrude when viewed from the upstream side, a flow path in the main body is restricted so that the velocity of a water flow in the main body increases due to compression. When such a water flow passes through the slits, vacuum areas are created downstream from the slits.

Further, since the recesses are provided in the downstream-side surfaces of the columns, the water flow that has passed through the slits and reached the downstream-side surfaces is sucked into the recesses and the velocity of the water flow increases so that vacuum areas are also created here.

In the bubble generating part having such a structure as described above, vacuum areas are created downstream from the slits, and further vacuum areas are also created around the recesses provided in the downstream-side surfaces of the columns. As a result, a sufficient amount of microbubbles are generated.

Further, the slits of the bubble generating part are defined by the columns that protrude from the main body, that is, by the columns integrally formed with the main body, and therefore the main body and the columns are formed as an integrally-molded article. Here, since the amount of protrusion of the columns gradually reduces from the downstream-side surfaces thereof toward the upstream side, a molding die can be pulled out toward the upstream side. Similarly, since the downstream-side surfaces have only the recess, a molding die can be pulled out toward the downstream side. That is, this bubble generator can be formed as a resin molded product using a molding die that can be radially split in the main body.

A second aspect of the present disclosure is defined as follows: A bubble generator according to the second aspect of the present disclosure is the bubble generator of the first aspect of the present disclosure wherein the center is located on a central axis of the main body.

In the bubble generator according to the second aspect of the present disclosure as defined above, the radiation center of the slits that radially extend coincides with the center of the main body. Therefore, the slits are formed so as to radially extend from the center of one imaginary cross section of the main body. Thus, the slits are evenly distributed in the main body. This allows water to easily flow in the main body, and therefore a higher flow velocity of the water is achieved. When the flow velocity is higher, more bubbles can be generated.

A third aspect of the present disclosure is defined as follows: A bubble generator according to the third aspect of the present disclosure is the bubble generator of the first or second aspect of the present disclosure in which a surface defined by edges of the adjacent slits is defined as the downstream-side surface, a cross-sectional area of each of the columns gradually reduces toward the upstream side and becomes substantially zero at an upstream end of the main body.

In the third aspect of the present disclosure as defined above, the shape of the columns of the bubble generator is more specifically described. That is, since the cross-sectional area of each of the columns becomes substantially zero at the upstream end of the main body, that is, the columns start to protrude from the upstream end of the main body, the resistance of the columns to a water flow can be made as small as possible to maximize the flow velocity of water flowing in the main body.

A fourth aspect of the present disclosure is defined as follows: A bubble generator according to the fourth aspect of the present disclosure is the bubble generator of the first or second aspect of the present disclosure in which each of the columns has a conical shape having, as a bottom surface, a surface defined by edges of the adjacent slits, and a ridgeline of each of the columns connects an intersection point of edges of the adjacent slits and a point that is on the inner peripheral surface of the main body and that intersects with an imaginary bisecting plane of the edges.

In the fourth aspect of the present disclosure as defined above, the shape of each of the columns of the bubble generator is more specifically described. That is, since each of the columns has a conical shape and the ridgeline thereof connects to the inner peripheral surface of the main body, that is, the ridgeline starts to rise from the inner peripheral surface of the main body, the resistance of the columns to a water flow can be made as small as possible.

A fifth aspect of the present disclosure is defined as follows: A bubble generator according to the fifth aspect of the present disclosure is the bubble generator of any one of the first to fourth aspects of the present disclosure in which the recesses provided in the downstream-side surfaces of the columns are radially arranged around the center.

In the bubble generator according to the fifth aspect of the present disclosure as defined above, the recesses are evenly distributed in an imaginary cross section of the main body that defines the downstream-side surfaces of the columns. As a result, bubbles resulting from the recesses are also evenly generated.

A sixth aspect of the present disclosure is defined as follows. A bubble generator according to the sixth aspect of the present disclosure is the bubble generator of any one of the first to fifth aspects of the present disclosure in which the recesses pass through the inner peripheral surface of the main body to form cavities in a peripheral wall of the main body.

In the bubble generator according to the sixth aspect of the present disclosure as defined above, since the recesses communicate with the cavities formed in the peripheral wall, a water flow is easily sucked into the recesses. This promotes the production of a vacuum.

It is to be noted that the cavities formed in the peripheral wall of the main body may be located inside the peripheral wall or may be located between another part against which the peripheral wall abuts and the peripheral wall.

A seventh aspect of the present disclosure is defined as follows: The seventh aspect of the present disclosure is directed to a bubble generating unit including: at least one of the bubble generators any one of the first to sixth aspects of the present disclosure; and a housing that has an orifice whose small-diameter portion accommodates the bubble generator, wherein the main body of the bubble generator is embedded in the housing, and the columns are exposed in the small-diameter portion of the orifice.

As described above, the bubble generator can be formed by molding, that is, the bubble generator itself can be inexpensively formed by unifying its standards. The housing that accommodates the standardized bubble generator is freely designed so that the bubble generator can be applied to various water flow sources.

For example, when the bubble generating unit including one bubble generator is applied to a water flow (0.15 MPa to 0.75 MPa) supplied from a tap water supply pipe, microbubbles can be generated without any need for the application of pressure using a pump or another device. In this case, it is preferred that the diameter of opening of the housing be 10 to 30 mm, and the outer diameter of the housing be equal to the outer diameter of the water supply pipe.

When the bubble generating unit is applied to a water flow supplied from a tap, the diameter of upstream end (region where substantially no column is present) of the inner peripheral surface of the main body of the bubble generator is preferably 5.0 to 10.0 mm. The width of each of the slits is 0.1 to 3 mm, and the slits are evenly formed so as to radially extend from the center of the main body. The number of the slits is preferably 4 to 10. The slits are preferably formed so as to be in contact with the inner peripheral surface of the main body, but may be formed so as to extend partway toward the inner peripheral surface when viewed from the center.

When a pressurized water flow is used, the two or more bubble generators are preferably arranged in series in the housing. At this time, the slits of the bubble generators are preferably aligned in the direction of a water flow, that is, in the axial direction of the housing. This is to secure a flow velocity at which a water flow passes through the slits. According to the study by the present inventors, the flow velocity at which a water flow passes through the slits is preferably 100 msec or higher.

An eighth aspect of the present disclosure is defined as follows. A bubble generating unit according to the eighth aspect of the present disclosure is the bubble generating unit according to the seventh aspect of the present disclosure in which the housing is divided into pieces perpendicularly to its axis in the small-diameter portion, and the main body of the bubble generator is sandwiched between the divided pieces.

In the bubble generating unit according to the eighth aspect of the present disclosure defined as above, the bubble generator is easily assembled to the housing. This makes it possible to provide an inexpensive bubble generating unit.

A ninth aspect of the present disclosure is defined as follows. A bubble generating unit according to the ninth aspect of the present disclosure is the bubble generating unit according to the seventh aspect of the present disclosure in which one of the divided pieces and the bubble generator are integrally molded.

The bubble generator can be formed by molding. Therefore, when each of the divided pieces of the housing is also designed so as to be formable by molding, the divided piece and the bubble generator can be integrally formed by molding. Therefore, when one of the divided pieces and the bubble generator are integrally molded according to the ninth aspect of the present disclosure, the number of parts of the bubble generating unit is reduced so that the manufacturing cost of the bubble generating unit can be reduced.

A tenth aspect of the present disclosure is defined as follows. The tenth aspect of the present disclosure is directed to a bubble generator including: a tubular main body; and a bubble generating part provided in the main body, wherein the bubble generating part includes a plurality of columns protruding from an inner peripheral surface of the main body, each of the columns has a structure obtained by cutting a trigonal pyramid into halves, a bottom surface thereof coincides with a downstream-side surface of the main body, a top thereof coincides with an upstream-side surface of the main body, and a ridgeline thereof extends toward a central axis of the main body, and a plurality of slits are provided each of which is located between edges of the bottom surfaces of the columns.

In the bubble generator according to the tenth aspect of the present disclosure defined as above, the resistance of the columns to a water flow is minimized by allowing each of the columns to have a trigonal pyramid. This makes it possible to create sufficient vacuum areas downstream from the slits.

An eleventh aspect of the present disclosure is defined as follows. A bubble generator according to the eleventh aspect of the present disclosure is the bubble generator according to the tenth aspect of the present disclosure in which each of the columns has a recess formed in the bottom surface thereof.

In the bubble generator according to the eleventh aspect of the present disclosure defined as above, since the recesses are provided in the bottom surfaces, vacuum areas are created also in the recesses. This improves bubble generating efficiency.

BRIEF DESCRIPTION OF DRAWINGS

FIG. 11A and FIG. 11B show a structure in which the two bubble generators shown in FIG. 9 are connected together, in which FIG. 11A shows an exploded view and FIG. 11B shows the generators together.

FIG. 18A and FIG. 18B show the structure of a bubble generator according to an embodiment of the present disclosure, in which FIG. 18A is a plan view viewed from a downstream side and FIG. 18B is a longitudinal sectional view.

DESCRIPTION OF EMBODIMENTS

First Embodiment

Figure 1:
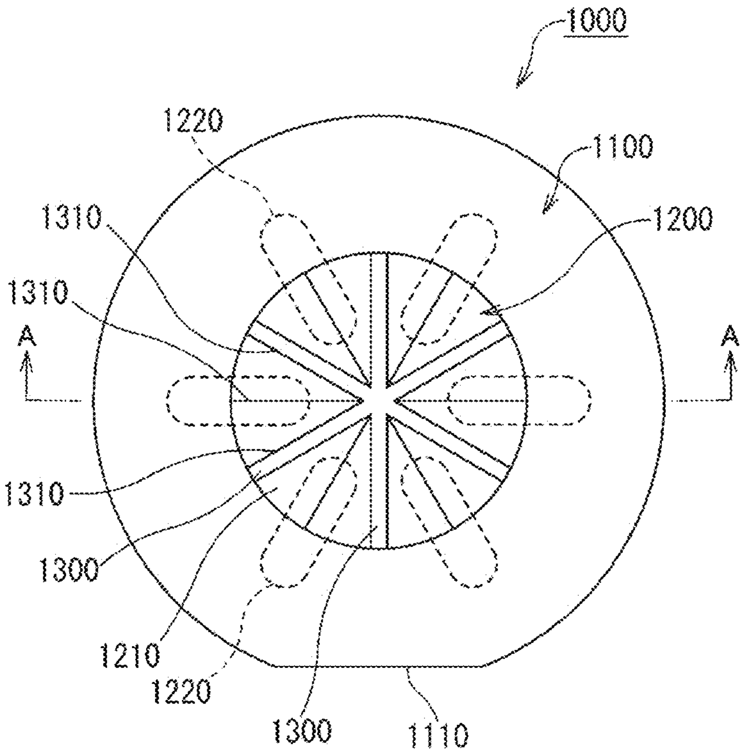
FIG. 1 is a plan view of a bubble generator according to a first embodiment of the present disclosure.
Figure 2:
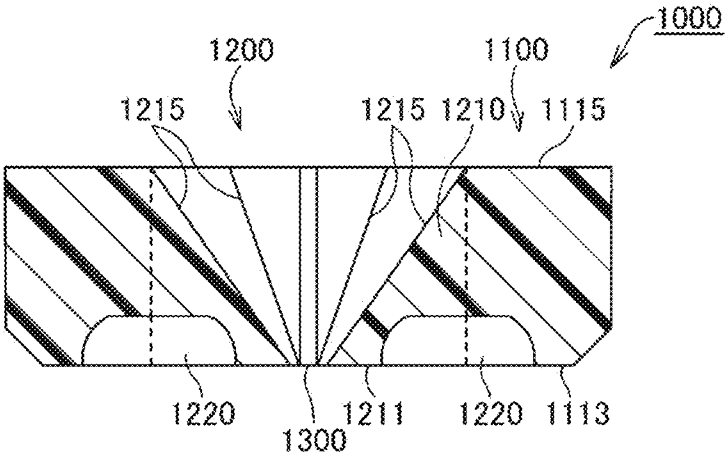
FIG. 2 is a cross-sectional view taken along a line A-A in FIG. 1.

FIG. 1 is a plan view of a bubble generator 1000 according to a first embodiment of the present disclosure. FIG. 2 is a cross-sectional view of the bubble generator 1000.

The bubble generator 1000 includes a main body 1100 and a bubble generating part 1200.

The main body 1100 is formed into a tubular shape. Part of the outer peripheral surface of the main body 1100 is cut out to form a flat portion 1110. This flat portion prevents unnecessary rotation and is used for positioning. The main body 1100 does not necessarily have a cylindrical shape, and may have any shape. For example, the main body 1100 may have a rectangular tubular shape. Further, the main body 1100 may be radially divided. The main body 1100 may be tapered such that its diameter reduces toward a downstream side in a water flow direction.

The bubble generating part 1200 includes columns 1210. The columns 1210 protrude from the inner peripheral surface of the main body 1100, and are integrally formed with the main body 1100. In this example, six columns 1210 are provided. Six slits 1300 are formed by the peripheral edges of the downstream-side surfaces (lower-side surfaces in FIG. 2) of the columns 1210.

The slits 1300 are formed radially in a plan view. In this example, the center of radiation coincides with the central axis of the main body 1100. The center of radiation does not necessarily have to coincide with the central axis of the main body 1100. The slits 1300 are formed on one imaginary cross section of the main body 1100. In other words, in each of the columns 1210, a portion most protruding from the inner peripheral surface of the main body 1100 is formed on the imaginary cross section. This most protruding portion preferably coincides with the peripheral edge of a bottom surface 1211 of the column 1210.

The bottom surface 1211 is preferably formed at a right or sharp angle with respect to the water flow direction in the most protruding portion. This is because a flow velocity more greatly changes so that a vacuum can be produced there.

A recess 1220 is provided in the bottom surface 1211. A water flow that has passed through the slits 1300 and reached the bottom surface side is further sucked into the recesses 1220, which promotes the production of a vacuum on the bottom surfaces 1211.

In order to uniformly produce a vacuum, the recesses 1220 are preferably evenly arranged radially around the center of the slits 1300, that is, around the central axis of the main body 1100.

These recesses 1220 extend to the main body 1100. A portion of each of the recesses 1220 present in the main body 1100 serves as a cavity during use. Water that has already been present in the recesses 1220 interferes with water that is going to flow into the recesses 1220, but this interference is relieved by these cavities. Therefore, the effect of producing a vacuum is enhanced.

In this example, the slits 1300 are formed to have the same width, but may be changed in width. Here, the change in width means both difference in width among slits and difference in width in one slit.

The cross-sectional area of each of the columns 1210 gradually reduces from the bottom surface 1211 toward the upstream side. The cross-sectional area becomes zero at the upstream-side surface of the column 1210. This makes it possible to reduce the resistance of the columns to a water flow. Further, such a structure makes it possible to withdraw a mold without resistance after molding.

The columns 1210 in this example each have a conical shape having, as the bottom surface 1211, a surface defined by edges 1310 of the slits 1300. A ridgeline 1215 of each of the columns 1210 is defined as follows. That is, the ridgeline 1215 is a line connecting an intersection point of the edges 1310 and 1310 of the adjacent slits 1300 and the most upstream point of the inner peripheral surface of the main body 1100 that intersects with the imaginary bisecting plane of the edges 1310 and 1310.

In this example, the bottom surface 1211 of each of the columns 1210 coincides with a downstream-side surface 1113 of the main body 1100, and the upstream end of each of the columns 1210 coincides with an upstream-side surface 1115 of the main body 1100. Both of them do not necessarily have to coincide with each other. For example, the length of the main body 1100 in the water flow direction may be larger than that of each of the columns 1210.

In this example, all the columns 1210 have the same shape, but may have different shapes.

Figure 3:
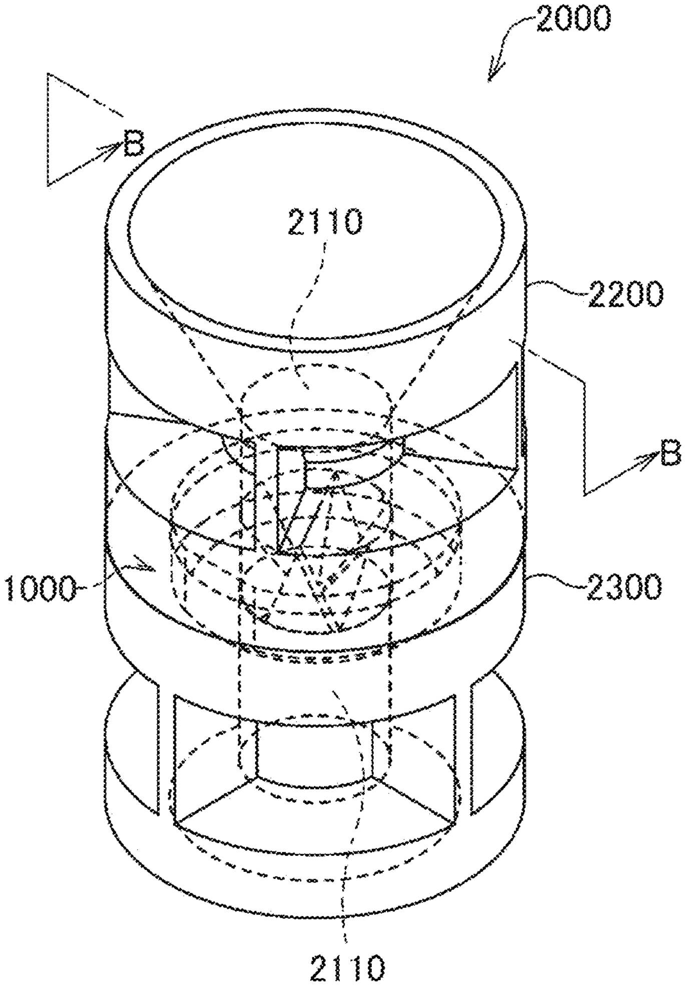
FIG. 3 is a perspective view showing the structure of a bubble generating unit provided with the bubble generator shown in FIG. 1.
Figure 4:
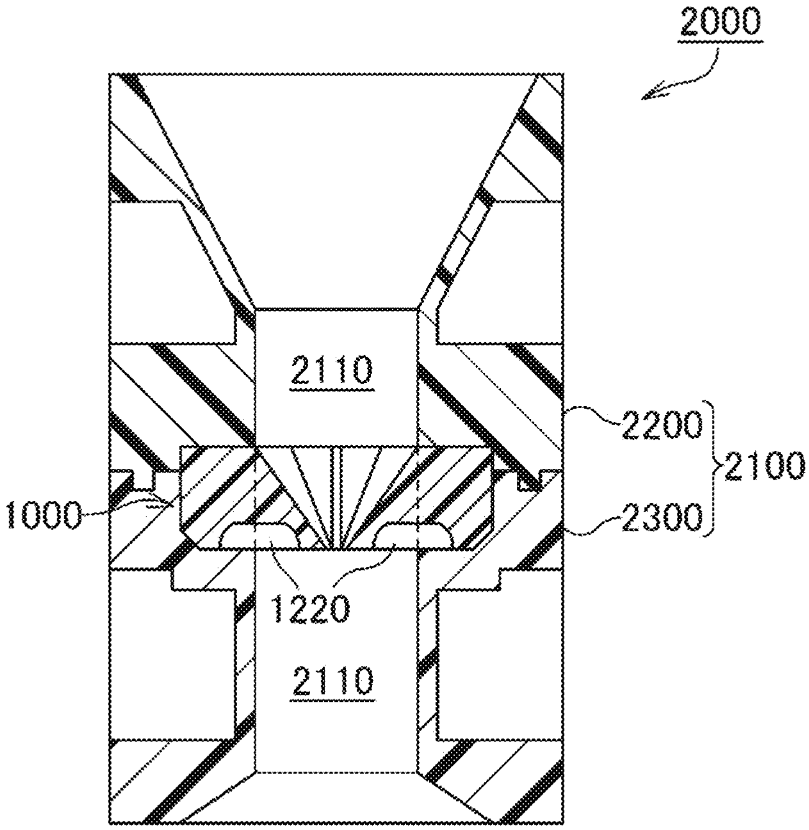
FIG. 4 is a cross-sectional view taken along a line B-B in FIG. 3.
Figure 5:
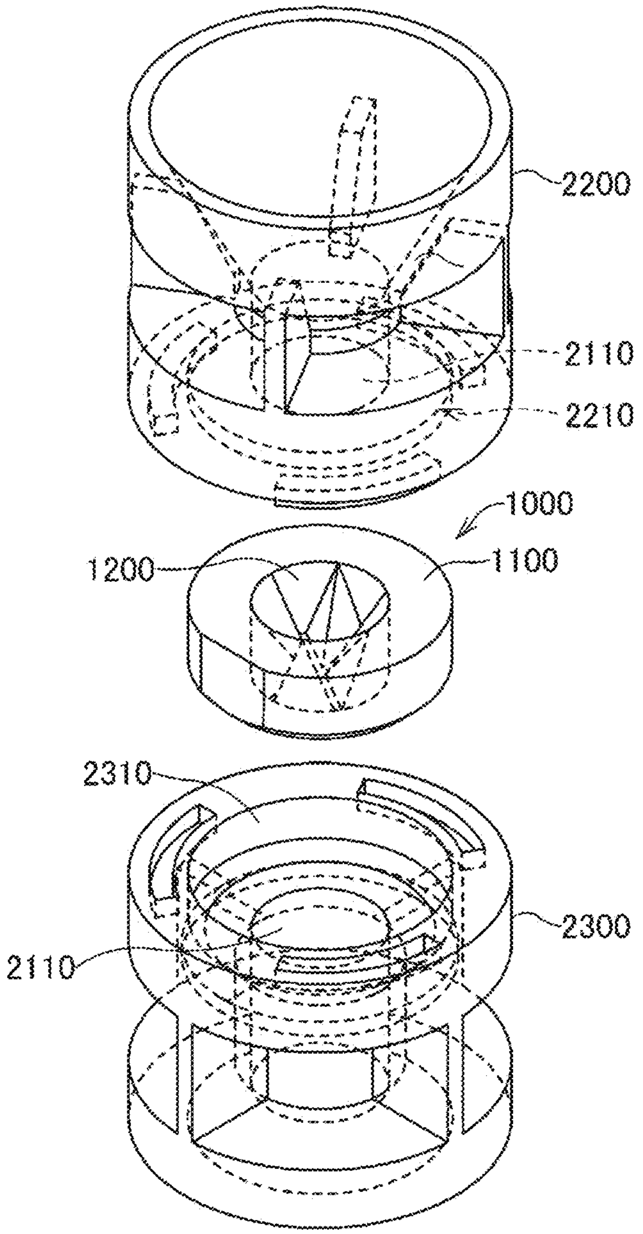
FIG. 5 is an exploded perspective view of a bubble generating unit.

FIGS. 3 to 5 show an example of a bubble generating unit 2000 provided with the bubble generator 1000 that has been described above.

This bubble generating unit 2000 includes the bubble generator 1000 and a housing 2100.

The housing 2100 includes an upstream piece 2200 and a downstream piece 2300. As shown in FIG. 4, an orifice 2110 is provided along the inner periphery of the housing 2100 when the upstream piece 2200 and the downstream piece 2300 are connected together.

A housing recess 2210 is provided in the surface of the upstream piece 2200 facing the downstream piece 2300, and a housing recess 2310 is provided in the surface of the downstream piece 2300 facing the upstream piece 2200. The main body 1100 of the bubble generator 1000 is accommodated in a space formed by these housing recesses 2210 and 2310.

The diameter of inner peripheral surface of the orifice 2110 is the same as that of inner peripheral surface of the main body 1100. This is to make resistance to a water flow as small as possible.

A portion of each of the recesses 1220 provided in the bottom surface 1211 of the bubble generating part 1200 is embedded in the housing 2100. In the portion embedded in the housing 2100, an air reservoir (cavity) is formed. This air reservoir allows a water flow to be easily sucked into the recess 1220, which promotes the production of a vacuum.

The structure of the housing is freely designed depending on the intended use of the bubble generating unit 2000. The upstream piece 2200, the downstream piece 2300, and the bubble generator 1000 are joined in a liquid-tight manner by an adhesive or a high-frequency welding. These members are preferably made of the same resin material or resin materials of the same type.

In this example, the upstream piece 2200, the downstream piece 2300, and the bubble generator 1000 are formed as separate parts, but the bubble generator 1000 and the upstream piece 2200 or the bubble generator 1000 and the downstream piece 2300 may be integrally formed. In order to embed a portion of each of the recesses 1220 in the housing 2100, the bubble generator 1000 and the upstream piece 2200 are preferably integrally formed.

Figure 6:
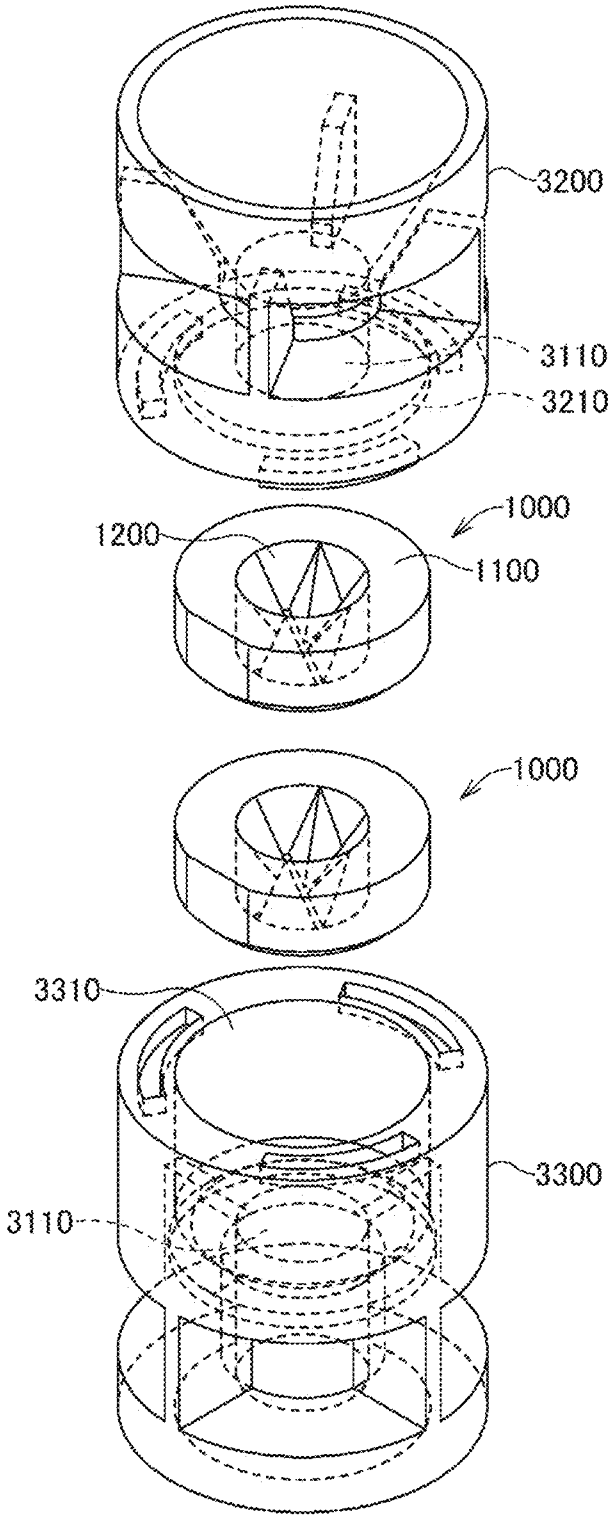
FIG. 6 is an exploded perspective view showing the structure of a bubble generating unit provided with the two bubble generators according to the first embodiment.
Figure 7:
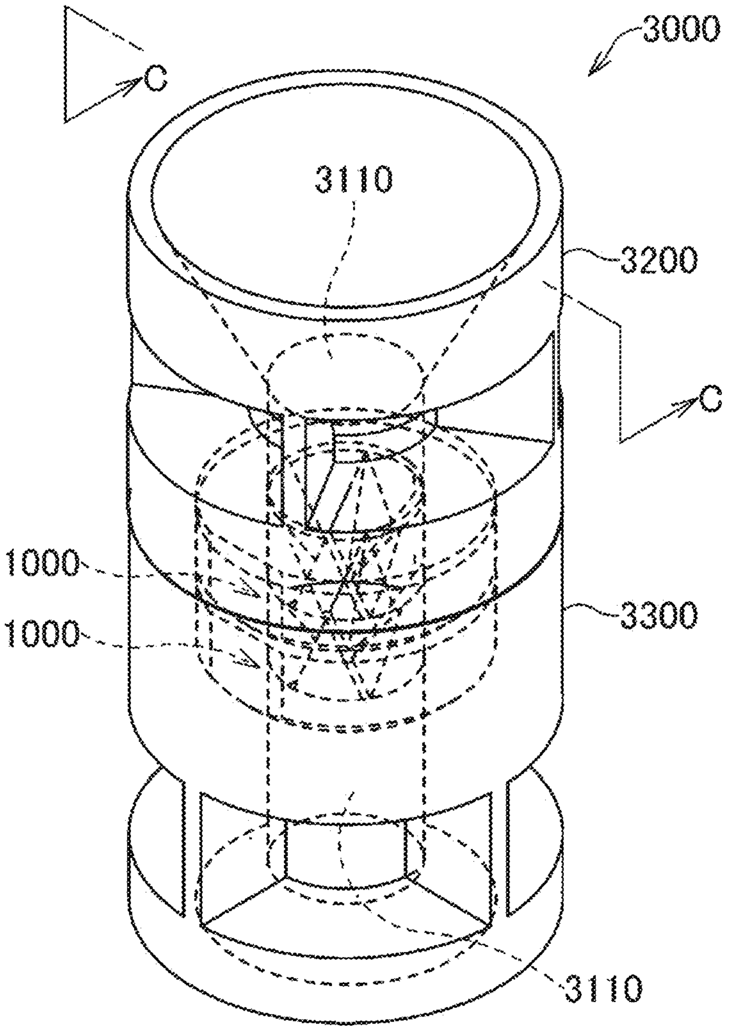
FIG. 7 is a perspective view showing the structure of the bubble generating unit shown in FIG. 6.
Figure 8:
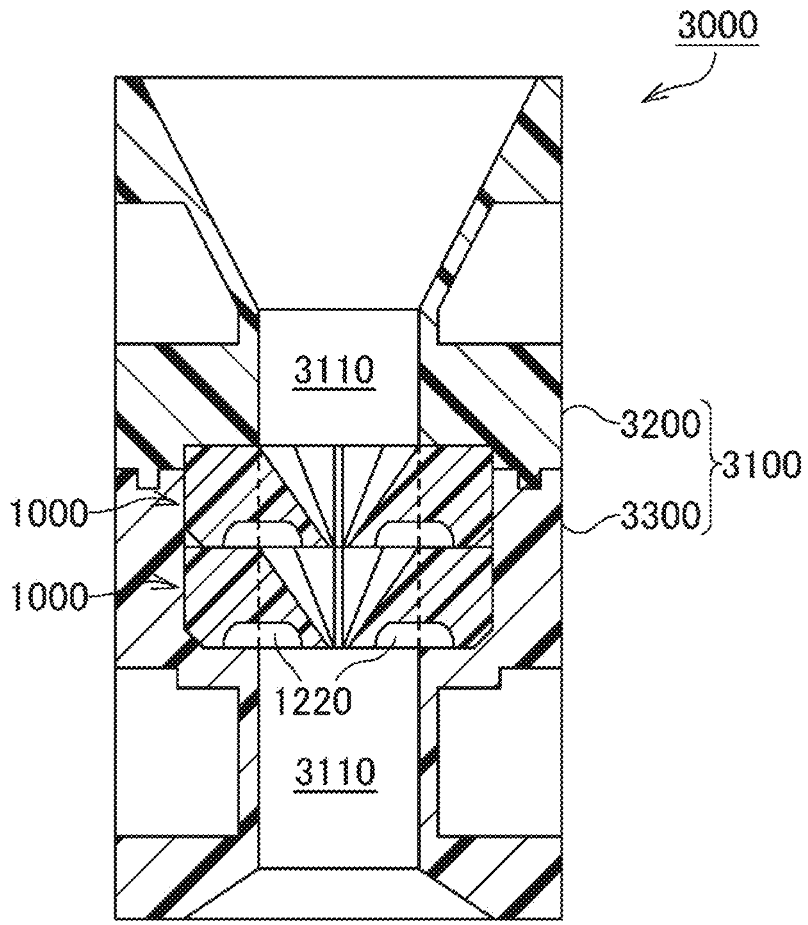
FIG. 8 is a cross-sectional view taken along a line C-C in FIG. 7.

FIGS. 6 to 8 show a bubble generating unit 3000 in which the two bubble generators 1000 are connected in the axial direction. It is to be noted that the same components as the example shown in FIGS. 1 to 5 are denoted by the same reference signs, and description thereof will be partially omitted. The three or more bubble generators 1000 may be connected.

This bubble generating unit 3000 includes the two bubble generators 1000 and a housing 3100.

The housing 3100 includes an upstream piece 3200 and a downstream piece 3300. As shown in FIG. 8, an orifice 3110 is provided along the inner periphery of the housing 3100 when the upstream piece 3200 and the downstream piece 3300 are connected together.

A housing recess 3210 is provided in the surface of the upstream piece 3200 facing the downstream piece 3300, and a housing recess 3310 is provided in the surface of the downstream piece 3300 facing the upstream piece 3200. The main body 1100 of the bubble generator 1000 is accommodated in a space formed by the housing recess 3210 and 3310.

Figure 9:
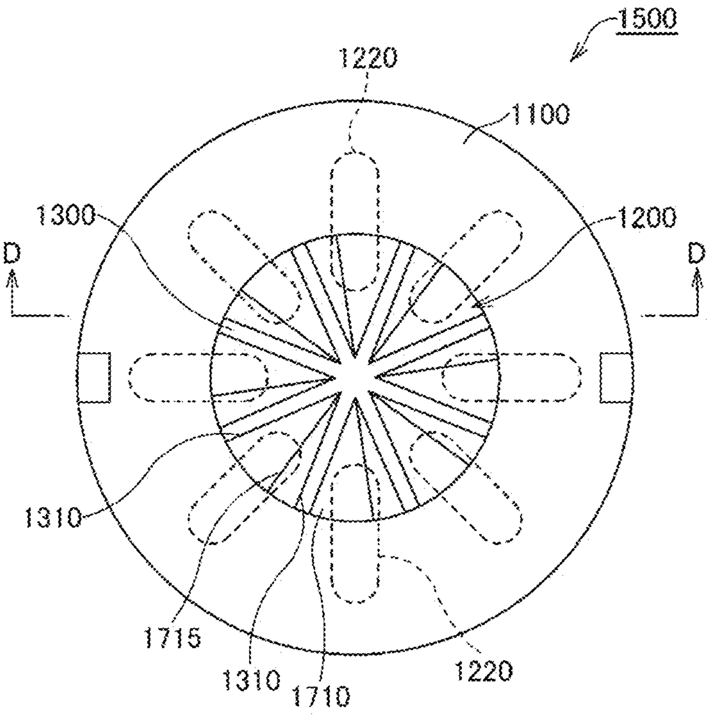
FIG. 9 is a plan view of a bubble generator according to another embodiment.
Figure 10:
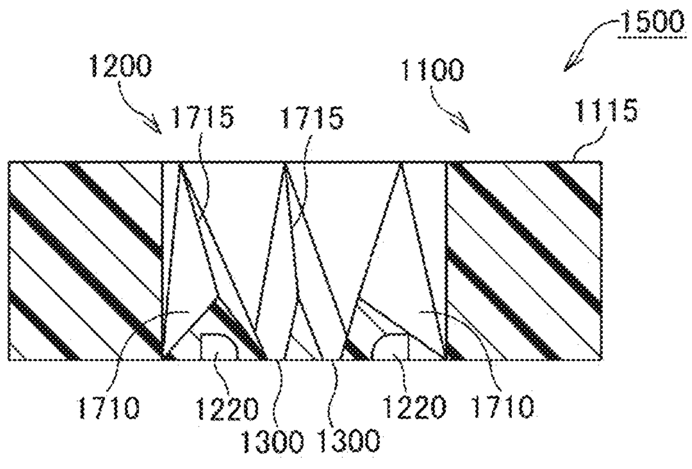
FIG. 10 is a cross-sectional view taken along a line D-D in FIG. 9.

FIGS. 9 and 10 show a bubble generator 1500 as another example. The same components as the example shown in FIGS. 1 and 2 are denoted by the same reference signs, and description thereof will be partially omitted.

The bubble generator 1500 has eight slits 1300. The bubble generator 1500 has a larger number of slits 1300, and therefore eight columns 1710 have a smaller width. Further, in this example, a ridgeline 1715 of each of the columns 1710 leans. That is, the ridgeline 1715 is displaced toward one of the edges 1310 and 1310 of the adjacent slits from the bisecting plane of the edges 1310 and 1310. This changes a water flow (i.e., a vortex flow is formed) in a bubble generating part so that the water flow can more smoothly pass through it.

The bubble generator 1500 can be inserted into the housing 2100 shown in FIG. 4.

Figure 11A:
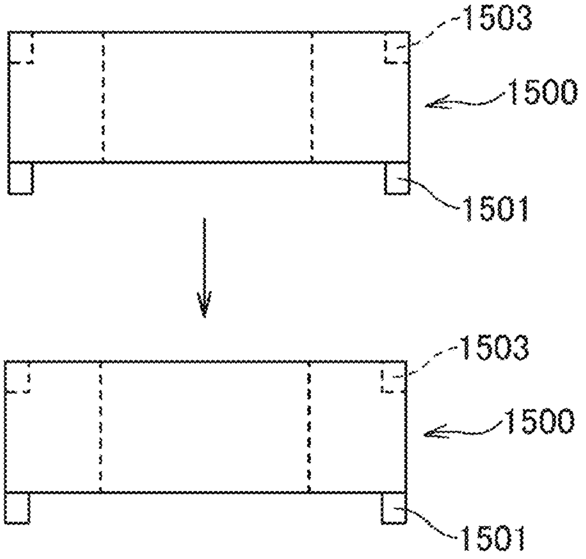
Figure 11B:
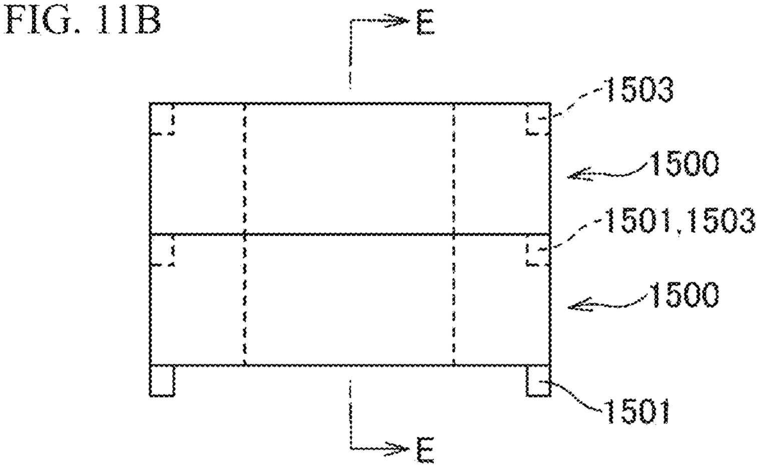
Figure 12:
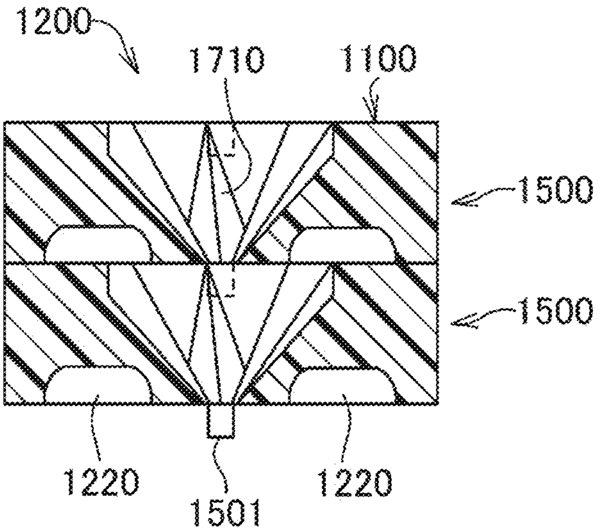
FIG. 12 is a cross-sectional view taken along a line E-E in FIG. 11B.

FIGS. 11A, 11B and 12 show an example in which the two bubble generators 1500 are connected. It is also possible to connect the three or more bubble generators. In this example, a projection 1501 for connection is provided on the lower surface of the main body 1100 of the bubble generator 1500, and an engagement recess 1503 is provided on the upper surface of the main body 1100 of the bubble generator 1500.

The bubble generators 1500 and 1500 assembled in this manner can be inserted into the housing 3100 shown in FIG. 8.

The bubble generating unit described above with reference to the first embodiment is designed assuming that it is incorporated into, for example, a shower head. Therefore, a sufficient amount of microbubbles are generated only by allowing water with a pressure of 0.15 to 0.75 MPa to pass through the bubble generator 1000 or 1500 once.

The examples will be described below.

The bubble generating unit 2000 shown in FIG. 4, that is, the bubble generating unit 2000 using one bubble generator 1000 was connected to a domestic tap through a commercially-available hose not shown. The tap was fully opened to supply tap water of about 0.5 MPa, and water discharged through the bubble generating unit 2000 was received in a bucket. The water was packed in a 75-mL glass bottle, and the glass bottle was capped and allowed to stand in a room. After about 12 hours, the amount of bubbles was measured. The amount of bubbles when the two bubble generators 1500 and 1500 connected together shown in FIG. 12 were used was also measured in the same manner. The results are shown in Table 1. It is to be noted that the measurement was performed using a nano particle size analyzer (SALD-7500nano) manufactured by SHIMAZDU CORPORATION. The width of each of the slits 1300 of the bubble generator 1000 used is 0.4 mm, the diameter of the inner peripheral surface of the main body 1100 is 6 mm, and the length of the main body 1100 is 4 mm. The width of each of the slits 1300 of the bubble generator 1500 is 0.5 mm, the diameter of the inner peripheral surface of the main body 1100 is 8 mm, and the length of the main body 1100 is 4 mm.

TABLE 1

| Type of bubble generator | Water source | Amount of bubbles per mL | | Peak particle diameter |
|---|---|---|---|---|
| | | 1 μm or less | 20 μm or less | |
| 6 slits × 1 | Domestic tap | 132,750,000 bubbles | 132,760,000 bubbles | 0.103 μm |
| 8 slits × 2 | Same as above | 141,840,000 bubbles | 141,850,000 bubbles | 0.103 μm |

As can be seen from the results shown in Table 1, a sufficient amount of so-called nanobubbles are generated.

The bubble generating unit according to the present disclosure that generates the above-described amount of nanobubbles by allowing tap water to pass through it once can be used for various purposes.

Oxygen was supplied to tap water supplied to the bubble generating unit shown in FIG. 4, and the amount of dissolved oxygen (mg/L) was measured. The results are as follows.

(A) Amount of oxygen supply 0.3 L/min: 31.4 mg/L (B) Amount of oxygen supply 0.5 L/min: 33.5 mg/L (C) Amount of oxygen supply 1.0 L/min: 34.88 mg/L Oxygen was supplied by bubbling from an oxygen cylinder to the upstream side of the bubble generating unit. It is to be noted that the amount of oxygen dissolved in tap water itself was 7.6 mg/L (26.5° C.).

Figure 13:
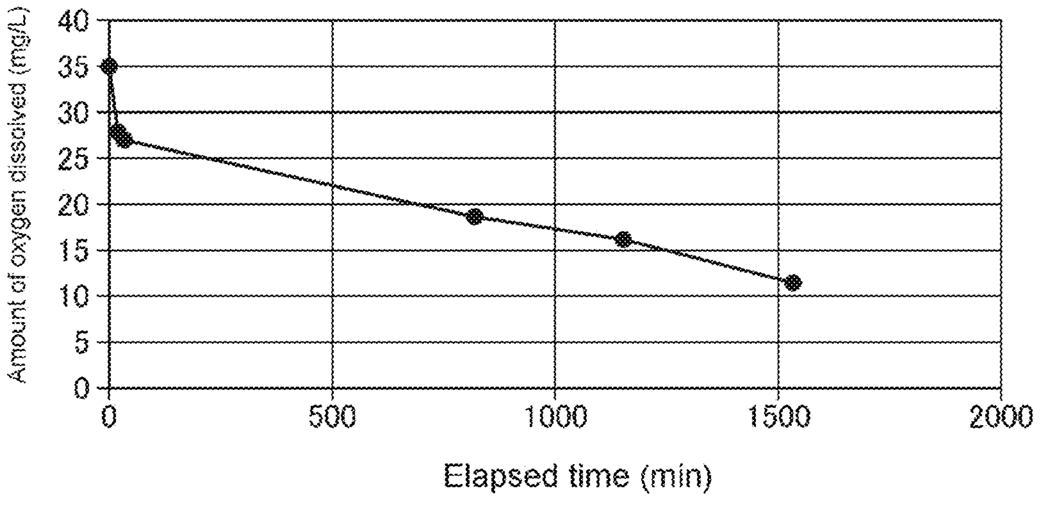
FIG. 13 is a graph showing a temporal change in the amount of dissolved oxygen.

The amount of oxygen dissolved in water obtained in Experiment (C) was changed as shown in FIG. 13.

The amount of dissolved oxygen was measured by a polarographic electrode method using HI-98193 manufactured by Hanna Instruments Japan.

Second Embodiment

Hereinbelow, a second embodiment according to the present disclosure will be described.

A first model according to the second embodiment of the present disclosure is defined as follows:

(1) A bubble generator including: a tubular main body; and a bubble generating part provided in the main body, wherein the bubble generating part includes:

a base having a water flow hole whose diameter reduces along a direction of a water flow; and a plurality of columns that connect the base and an inner peripheral surface of the main body, the columns each having a recess on its back side in the water flow direction.

In the bubble generator of the first model defined as above, when a water flow flowing in the main body passes through the base of the bubble generating part, the flow velocity of the water flow increases in the water flow hole whose diameter reduces along the water flow direction so that a high vacuum is produced when the water flow is discharged from the outlet of the water flow hole. Further, each of the columns has a recess formed on the back side thereof, and therefore when passing between the columns and then reaching the back side of the columns, a water flow is sucked into the recesses so that the flow velocity of the water flow increases and a vacuum is produced there.

In this way, a plurality of vacuum areas are created immediately downstream from the bubble generating part, and as a result, a sufficient amount of microbubbles are generated in the vacuum areas.

In the above-described bubble generator, the tubular main body preferably has an orifice-shaped through hole. The main body preferably has, at both ends thereof, connecting portions to which a pipe or hose is attached. As such connecting portions, screw threads may be provided.

The bubble generator according to the present disclosure takes a water flow (0.15 MPa to 0.75 MPa) exclusively supplied from a tap water supply pipe in the main body directly, that is, without increasing the flow velocity of the water flow with a pump or another device, and generates microbubbles in vacuum areas immediately downstream from the bubble generating part. Therefore, it is preferred that the diameter of the through hole of the main body be 10 to 30 mm, and the outer diameter of the main body be also equal to the outer diameter dimension of the water supply pipe.

Of course, the possibility of increasing the flow velocity of tap water with a pump or another device before introducing into the bubble generator according to the present disclosure is not ruled out, but one of the effects of the present disclosure is that bubbles of the order of nanometers can be generated without using a pump or another device (i.e., simply and inexpensively).

The possibility that a water flow having bubbles once generated by another bubble generator or the bubble generator according to the present disclosure is further introduced into the bubble generator according to the present disclosure is not ruled out.

A second model according to the second embodiment of the present disclosure is defined as follows. In the bubble generator defined as the first model, each of the columns has surfaces that face the water flow (hereinafter, referred to as "water flow-facing surfaces"), the water flow-facing surfaces are inclined, and each of the recesses is provided in a back surface of the column in the water flow direction and has wall surfaces parallel to the water flow-facing surfaces.

In the bubble generator of the second model defined as above, since the water flow-facing surfaces of each of the columns are inclined, a water flow easily changes (the velocity of a water flow easily increases), and since the wall surfaces of each of the recesses are parallel to the water flow-facing surfaces, the depth (length in the opposite direction of the water flow) of the recess provided in the back surface of each of the columns can be maximized.

Further, the columns having such a structure as described above do not have an undercut in the water flow direction, and therefore have a shape suitable for resin molding.

A third model according to the second embodiment of the present disclosure is defined as follows. In the bubble generator defined as the second model, each of the columns has a cross section whose shape along the water flow is a V shape whose width increases along the water flow.

In the bubble generator defined as the third model defined as above, since the V-shaped columns that increase in width along the water flow are present, the interval between the inclined surfaces of the opposing columns (which corresponds to a water flow-accelerating hole (fourteenth model))

reduces along the water flow direction so that the velocity of the water flow passing through the interval between the columns increases and a cavitation effect is enhanced.

According to the study by the present inventors, when tap water supplied from a water supply pipe is directly introduced, the number of the columns in the third model is preferably 3 to 5, and the included angle of the V shape is preferably 15 to 35 degrees (fourth model). If the number of the columns is less than 3, the interval between the columns is too wide to sufficiently accelerate a water flow supplied from a tap. If the number of the columns exceeds 5, the resistance of the columns to a water flow supplied from a tap is too large. Therefore, both of the cases are not preferred. If the included angle of the V shape is less than 15 degrees, the columns are too thin, and therefore there is a fear that the intervals between the columns do not sufficiently narrow so that a water flow flowing between the columns cannot be sufficiently accelerated. If the included angle of the V shape exceeds 35 degrees, the columns are too thick so that the resistance to a water flow unnecessarily increases.

A fifth model of the second embodiment of the present disclosure is defined as follows. In the bubble generator described as the third or fourth model, a tip of V shape of each of the columns is located at an upstream-side end of the base with respect to the water flow, and an open end of V shape of each of the columns is located at a downstream-side end of the base with respect to the water flow.

In the bubble generator of the fifth model defined as above, the base and the columns constituting the bubble generating part have the same length in the water flow direction. This allows the bubble generating part to have a compact structure, and therefore a size reduction of the bubble generating part can be achieved. Further, the downstream-side end of the base and the downstream-side ends of the columns are located at the same position in the water flow direction, and therefore a vacuum area created at the outlet of the base and vacuum areas created on the back side of the columns are located as close as possible. As a result, a cavitation effect is enhanced. This is because it can be considered that if the vacuum areas are separated from one another, each of the vacuum areas becomes unstable due to the influence of its surroundings, but when close to one another, the vacuum areas sometimes overlap and expand and are therefore stabilized.

A sixth model of the second embodiment of the present disclosure is defined as follows. In the bubble generator defined as any one of the first to fifth models, the columns are evenly arranged around the base so that centers of the recesses provided in the back surfaces of the columns are located on imaginary lines radially extending from a center of outlet of the water flow hole in a direction orthogonal to the water flow.

In the bubble generator of the sixth model defined as above, the centers of the recesses provided in the back surfaces of the columns are evenly distributed around the water flow hole of the base. This allows vacuum areas created in the back surfaces of the columns to be evenly arranged with respect to a vacuum area created downstream from the water flow hole of the base, which stabilizes the vacuum areas.

A seventh model according to the second embodiment of the present disclosure is defined as follows. In the bubble generator defined as any one of the first to sixth models, a center line of the water flow hole of the base coincides with a center line of the tubular main body.

In the bubble generator of the seventh model defined as above, since the base is arranged at the center of the main body, the velocity of the water flow around the base becomes constant. This makes vacuum areas created on the back side of the columns more uniform around the base. Therefore, all the vacuum areas created downstream from the bubble generating part, including a vacuum area created downstream from the base, are stabilized.

An eighth model of the second embodiment of the present disclosure is defined as follows. In the bubble generator defined as any one of the first to seventh models, an air vent is provided which allows an outer surface of the tubular main body to communicate with the recess of the column.

In the bubble generator of the eighth model defined as above, a gas (e.g., oxygen, carbon dioxide, nitrogen) can be forcibly supplied from the outside through the air vent to generate microbubbles of the supplied gas. In this case, the air vent may be provided for the recess of one of the columns (ninth model).

It is to be noted that when air microbubbles are to be generated, this air vent is preferably closed on the outer surface side of the main body.

When the air vent closed by the outer surface has a diameter of 0.5 to 10 mm to form an air reservoir therein, the efficiency of microbubble generation is improved. The reason for this is as follows. On the back surface of each of the columns, a water flow flowing into the recess and a water flow discharged from the recess interfere with each other, and therefore the water flows vibrate. Here, when the recess communicates with the air reservoir, it is considered that the vibrations of the water flows are stabilized and further amplified. Vibration is also considered to be one of mechanisms for generating bubbles in water.

A tenth model of the second embodiment of the present disclosure is defined as follows. In the bubble generator defined as any one of the first to ninth models, the inner peripheral surface of the main body has a projection provided between an outlet of the main body and the bubble generating part in a circumferential direction.

In the bubble generator of the tenth model defined as above, the projection provided on the inner peripheral surface of the main body interferes with vacuum areas created downstream from the bubble generating part so that a cavitation effect in the vacuum areas can be enhanced.

The height and width of the projection, the number of the projections, and the distance between the projection and the bubble generating part can be freely designed.

The projection may be continuous or intermittent.

A screw thread may be used as the projection (eleventh model). When a screw thread is provided on the inner peripheral surface of the main body, the bubble generator can be easily connected to another device by inserting a pipe into the main body and threadedly engaging the screw thread with a threaded tip of the pipe. In this case, generation of microbubbles can be sometimes controlled by adjusting the distance between the inserted pipe and the bubble generating part.

A twelfth model of the second embodiment of the present disclosure is defined as follows. In the bubble generator defined as any one of the first to eleventh models, the main body includes an upstream tubular part having a first through hole and a downstream tubular part having a second through hole, and the upstream tubular part has a downstream-side facing surface having a first recess whose diameter is larger than that of the bubble generating part formed around the first through hole, and part of the main body is hermetically inserted into the second through hole of the downstream tubular part, and a remaining part of the main body is inserted into the first recess so that a tip portion thereof faces the first through hole.

In the bubble generator of the twelfth model defined as above, the main body is configured to be divided into two parts so that the bubble generating part is inserted into the main body. Each of the parts (upstream tubular part and downstream tubular part) of the main body obtained by dividing the main body into two is a tubular member, and therefore can be formed by molding (e.g., injection molding) using a resin material. Further, the bubble generating part including a base and columns can also be formed by molding. Therefore, the bubble generator can be entirely made of a resin, which leads to a reduction in production costs.

Further, in this model, the first recess having a larger diameter than the bubble generating part is provided in the downstream-side facing surface of the upstream tubular part, which facilitates assembly. That is, part of the bubble generating part is liquid-tightly inserted into the second through hole of the downstream tubular part. As a result, the remaining part of the bubble generating part projects from the downstream tubular part. On the other hand, the projecting remaining part of the bubble generating part can be easily accommodated in the first recess of the upstream tubular part because the first recess having a larger diameter than the bubble generating part is provided in the downstream-side facing surface of the upstream tubular part.

A thirteenth model of the second embodiment of the present disclosure is defined as follows. In the bubble generator defined as the twelfth model, the downstream tubular part has a hole that allows an outer surface of the downstream tubular part to communicate with the second through hole.

In the bubble generator of the thirteenth model defined as above, the outer surface and the second through hole are connected through the hole so that the air vent defined in the eighth model is obtained.

From the viewpoint of forming the downstream tubular part by molding, this hole is preferably formed using a core. In this case, the diameter of the hole on its outer surface side is preferably larger than that on its second through hole side to secure the releasability of the core.

A fourteenth model of the second embodiment of the present disclosure is defined as follows. A bubble generator including: a tubular main body; and a bubble generating part provided in the main body, wherein the bubble generating part includes:

- a tubular base provided concentrically with the main body and having an inner peripheral surface whose diameter reduces along a water flow direction;
- a plurality of water flow-accelerating holes provided on an outer peripheral surface of the base so as to be reduced in diameter along the water flow direction; and
- a plurality of separating walls that separate the water flow-accelerating holes, the separating walls each having a recess formed on a back-surface side thereof in the water flow direction.

In the bubble generator of the fourteenth model defined as above, when a water flow flowing in the main body passes through the base of the bubble generating part, the flow velocity of the water flow increases in a water flow hole whose diameter reduces in the water flow direction so that a high vacuum is produced when the water flow is discharged from the outlet of the water flow hole. Further, each of the separating walls has a recess provided on the back side thereof, and therefore when passing through the water flow-accelerating holes and then reaching the back side of the separating walls, a water flow is sucked into the recesses so that the flow velocity of the water flow further increases, and a vacuum is produced there.

In this way, a vacuum area is created immediately downstream from the bubble generating part, and as a result, a sufficient amount of microbubbles are generated in the vacuum area.

The peripheral wall of each of the separation walls that defines the water flow-accelerating hole is not limited to the inclined surface defined in the second model described above, and may be formed into a curved surface (primary curved surface, multidimensional curved surface).

The width of each of the water flow-accelerating holes may change in the radial direction of the main body (i.e., in a direction perpendicular to a water flow).

In this disclosure, the base having a water flow hole at the center of the bubble generating part and the inner wall of the through hole of the main body are connected by the columns. In the conventional bubble generator, screws project from the inner wall of the through hole, and the tip of each of the screws is in the free state. In this case, the screws are in a cantilevered state and are therefore not mechanically stable, and there is a concern about durability. On the other hand, in this disclosure, the tips of the columns are connected to the base, and therefore the bubble generating part is mechanically stable and has high durability.

The columns used in this disclosure each have a recess in the back surface thereof when viewed from the water flow direction. When passing between the side surfaces of the columns and reaching the back surfaces of the columns, a water flow is sucked into the recesses, and therefore the velocity of the water flow increases and a high cavitation effect is obtained.

Figure 14A:
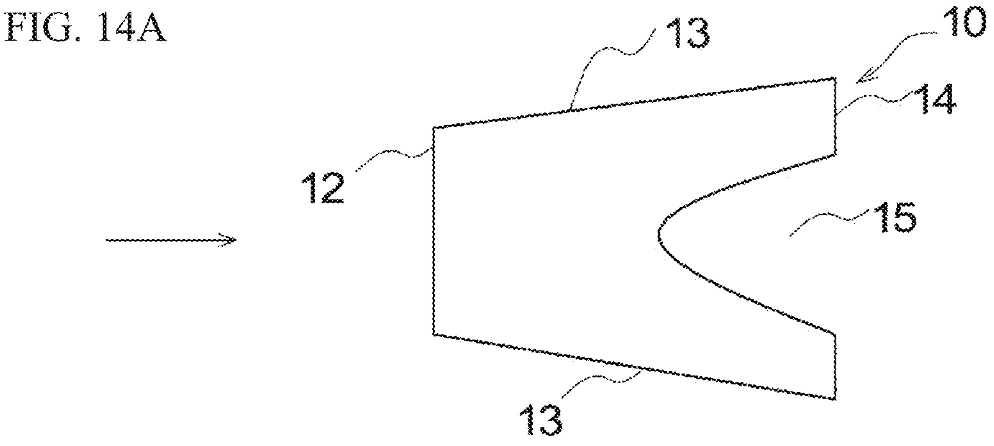
FIG. 14A, FIG. 14B and FIG. 14C are cross-sectional views of examples of a column of a bubble generator according to a second embodiment of the present disclosure.
Figure 14B:
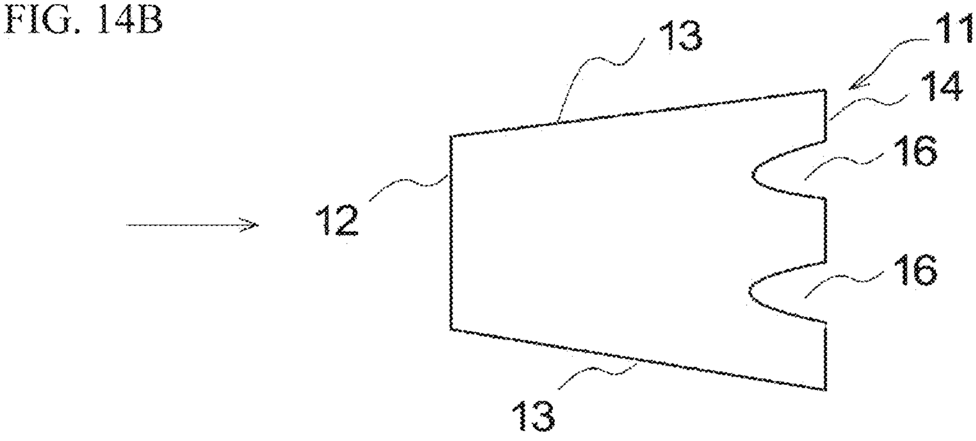
Figure 14C:
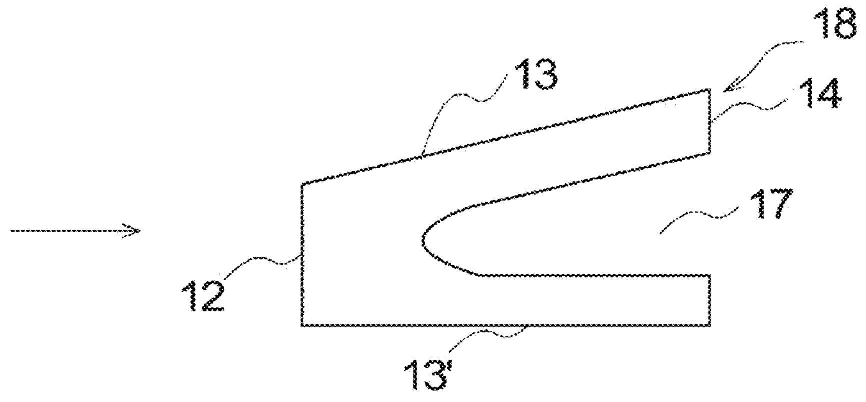

FIG. 14A to FIG. 14C show cross-sectional views of examples of such columns. In the drawings, each arrow indicates a water flow.

A column 10 shown in FIG. 14A has a cross section having a trapezoidal outline, and a recess 15 is provided in a back surface 14 of the column 10 corresponding to the base of the trapezoid. More specifically, the column 10 has a flat top 12, a pair of inclined surfaces 13 and 13, and a flat back surface 14. The interval between the inclined surfaces 13 and 13 gradually increases in the water flow direction. That is, the distance between the inclined surfaces 13 and 13 increases in the water flow direction. The recess 15 sucks a water flow so that the velocity of the water flow increases on the downstream side of the back surface 14. The shape of the recess 15 is not particularly limited as long as the recess 15 can exert such an effect. In the example shown in FIG. 14A, the recess 15 has side walls that extend from the back surface 14 toward the top so as to be parallel to the inclined surfaces 13 and 13 and a semicircular bottom wall connecting the side walls. The depth of the recess 15 can also be freely designed, but the ratio between the size of the opening and the depth of the recess 15 is preferably 1:0.5 to 3. In this example, the center of opening of the recess 15 and the center of the back surface 14 coincide with each other, but may not coincide with each other.

Alternatively, two or more recesses 16 and 16 may be provided like a column 11 shown in FIG. 14B. In this example, each of the recesses 16 and 16 has a similar shape to the recess 15, but may have any shape. Further, the recesses 16 and 16 may be different in shape. In this example, the recesses 16 and 16 are evenly distributed in the back surface 14. There is a case where the velocity of a water flow that reaches the back surface 14 can be changed by changing the volumes of the recesses 16 and 16 or by changing the distance from the inclined surfaces 13 and 13 to the recesses 16 and 16, and a cavity effect can be enhanced by adjusting the degree of such a change.

The recess 15 or the recesses 16 and 16 is/are preferably continuous in the axial direction (longitudinal direction) of the column 10, but may be discontinuous (the same applies to other columns that will be described below). When being discontinuous, the recess 15 or the recesses 16 and 16 may be provided in part of the back surface of the column, preferably on the base side.

FIG. 14C shows a column 18 as another example. It is to be noted that the same components as those shown in FIG. 14A are denoted by the same reference signs, and the description thereof will not be repeated. In this example, one of the inclined surfaces 13' is parallel to the water flow. A recess 17 has side walls that are respectively parallel to the inclined surfaces 13 and 13', and a semicircular bottom wall connecting these side walls.

Figure 15A:
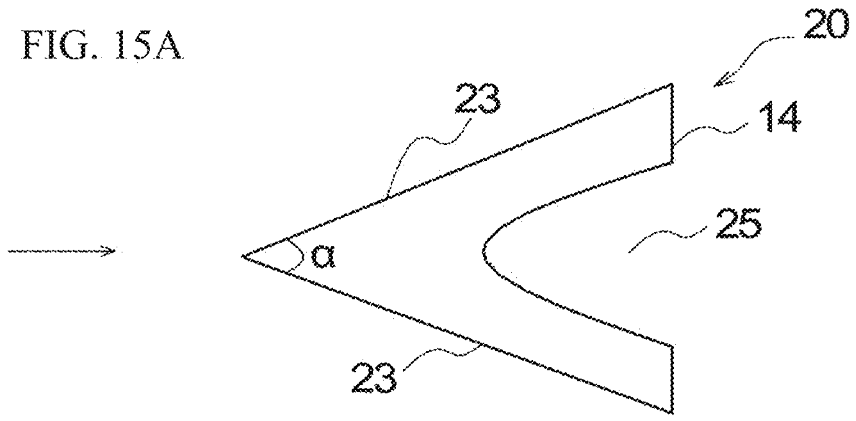
FIG. 15A, FIG. 15B and FIG. 15C are cross-sectional views of other examples of the column.

FIG. 15A shows a column 20 as another example. It is to be noted that the same components as those shown in FIG. 14 are denoted by the same reference signs, and the description thereof will be partially omitted. The column 20 has a cross section having a triangular outline (isosceles triangle), and the top thereof faces the water flow. A recess 25' is provided in a back surface 14 corresponding to the base of the triangle. As in the case shown in FIG. 14B, two or more recesses may be provided.

The included angle α of inclined surfaces 23 and 23 is preferably 10 to 35 degrees. The included angle α is more preferably 20 to 35 degrees, even more preferably 25 degrees. The angle between one of the inclined surfaces 23 and 23 and the water flow direction and the angle between the other inclined surface 23 and the water flow direction are the same. That is, the bisector of the top coincides with the water flow direction.

Figure 15B:
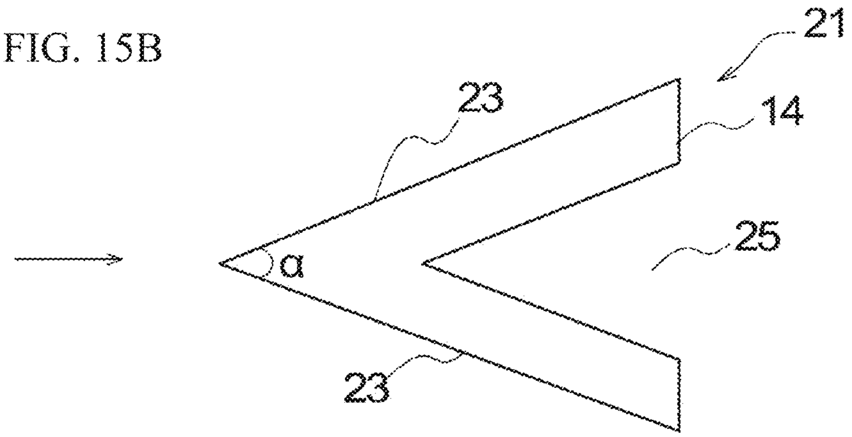

A column 21 shown in FIG. 15B has a V-shaped cross section. That is, side walls of a recess 25 are respectively parallel to inclined surfaces 23 and 23.

Figure 15C:
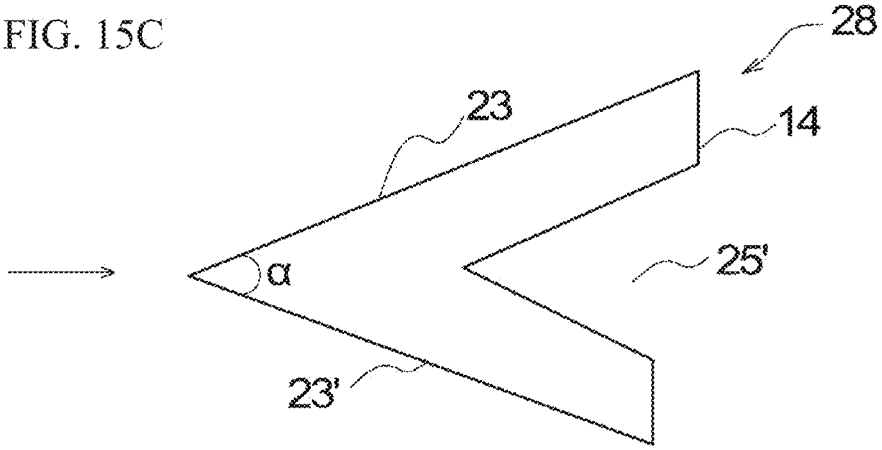

A column 28 shown in FIG. 15C has inclined surfaces 23 and 23' different in length. In this case, a water flow flowing into a recess 25' through the inclined surface 23 and a water flow flowing into the recess 25' through the inclined surface 23' are different in velocity, which may enhance a cavitation effect in the downstream region from the recess 25.

Figure 16A:
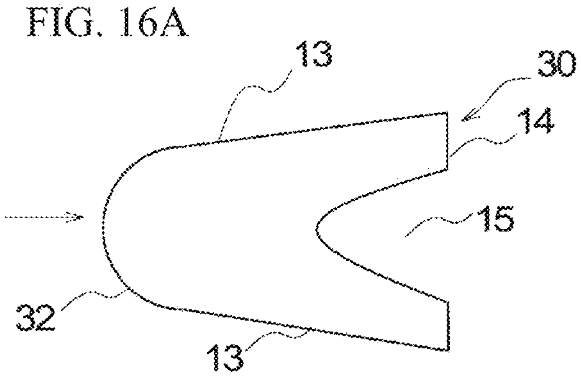
FIG. 16A, FIG. 16B, FIG. 16C and FIG. 16D are cross-sectional views of other examples of the column.

FIG. 16A shows a column 30 as another example. It is to be noted that in FIG. 16A, the same components as those shown in FIG. 14A are denoted by the same reference signs, and the description thereof will not be repeated. The column 30 has a top 32 having an arc-shaped outline. This reduces the resistance of the column to a water flow, which makes it possible to enhance a cavitation effect.

Figure 16C:
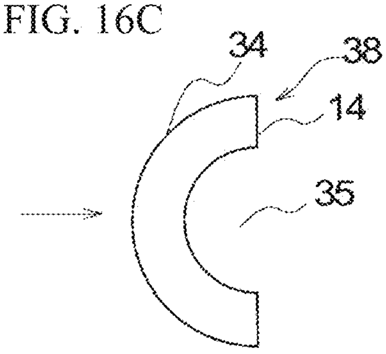
Figure 16B:
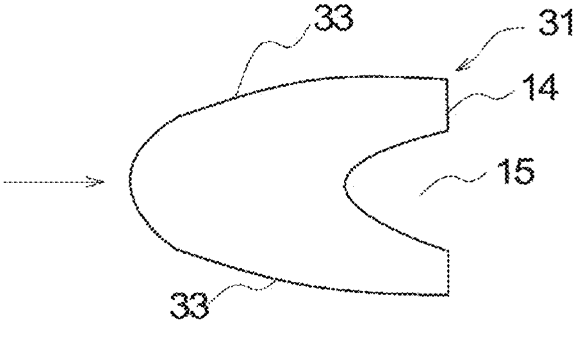

From the viewpoint of further reducing the resistance of the column to a water flow, as shown in FIG. 16B, an outer peripheral wall 33 of a column 31 may have a streamline shape as a whole.

A column 38 shown in FIG. 16C has an arc shape. More specifically, the column 38 has a semicircular outer peripheral wall 34, and a recess 35 has a semicircular peripheral wall concentric with the outer peripheral wall 34.

Figure 16D:
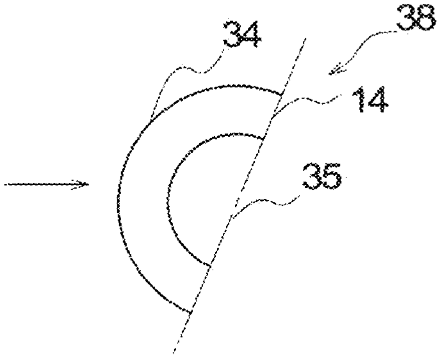

In an example shown in FIG. 16D, the column 38 is rotated in its circumferential direction. In this case, the velocity of a water flow flowing into the recess 35 varies in the vertical direction in FIG. 16D, which may enhance a cavitation effect in the downstream region from the recess 35.

The effect of tilting a column with respect to a water flow as shown in FIG. 16D will be described below.

Figure 17A:
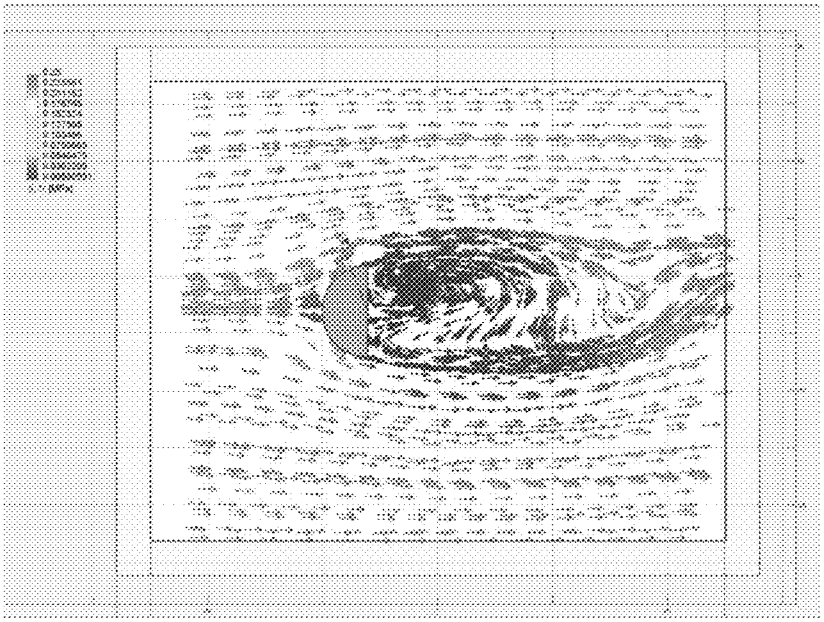
FIG. 17A shows a vacuum area distribution when a column directly faces a water flow.
Figure 17B:
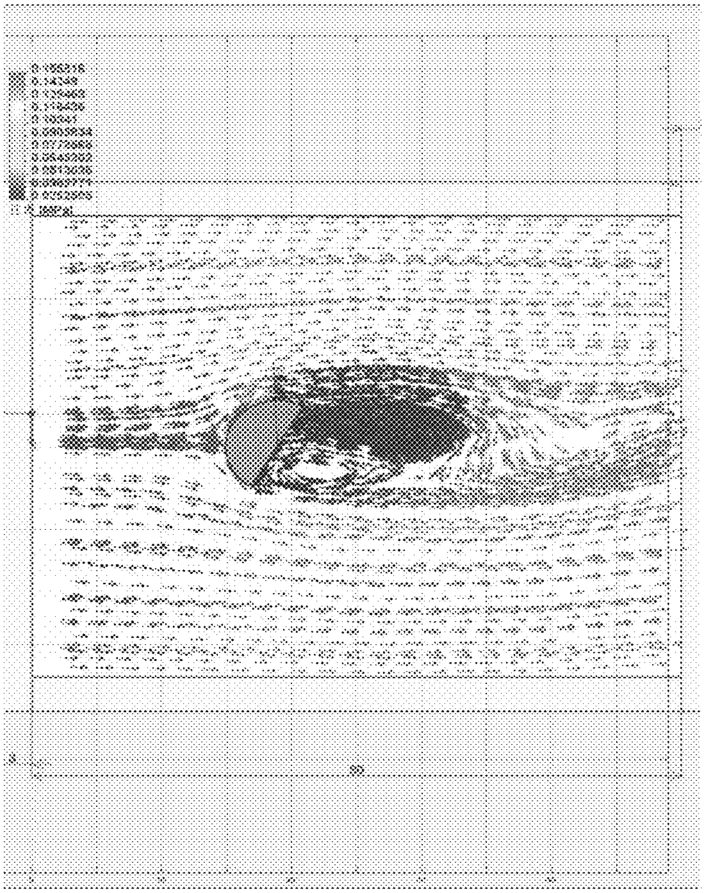
FIG. 17B shows a vacuum area distribution when a column is tilted with respect to a water flow.

FIG. 17A shows a pressure distribution in the downstream region from a column having a semicircular cross section when the column directly faces a water flow. Similarly, FIG. 17B shows a pressure distribution when the column is tilted. As is clear from FIG. 17B, a vacuum area expands when the column is tilted.

It is considered that the same effect can be exerted also when the column 38 shown in FIG. 16D or the column 28 shown in FIG. 14C is used.

Figure 18A:
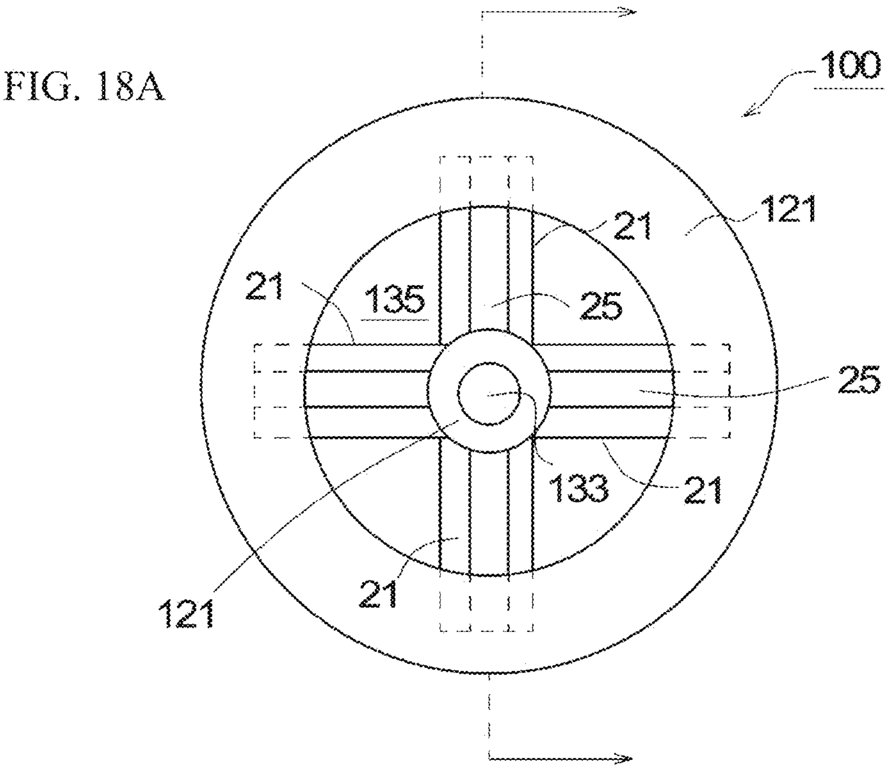
Figure 18B:
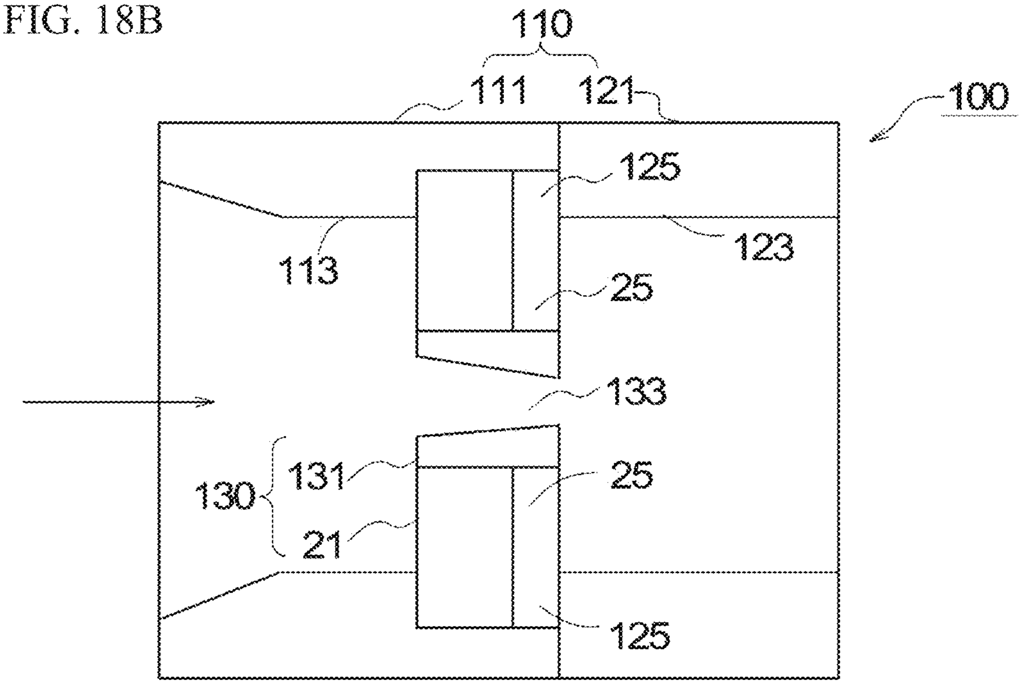

FIGS. 18A and 18B show a bubble generator 100 using the columns 21 shown in FIG. 15B as an example. The bubble generator 100 includes a main body 110 and a bubble generating part 130.

The main body 110 is tubular, and has an upstream tubular part 111 and a downstream tubular part 121. The upstream tubular part 111 has a through hole (first through hole) 113 whose diameter gradually reduces from its open end toward its center. The diameter of a small-diameter portion of the through hole 113 is the same as that of a through hole (second through hole) 123 of the downstream tubular part 121.

The bubble generating part 130 has a base 131 and columns 21. The base 131 is a tubular member, and its inner diameter reduces along a water flow direction so that a water flow hole 133 is formed. The center line of the base 131 coincides with the center line of the main body 110. In this example, the number of the water flow holes 133 is one, but may be two or more.

On the outer peripheral surface of the base 131, the V-shaped columns 21 shown in FIG. 15B are arranged in the vertical and horizontal directions (i.e., at equal intervals), and the tip portions thereof are embedded in the upstream tubular part 111. The recess 25 of each of the columns 21 is embedded in the upstream tubular part 111, and as a result, a cavity (air reservoir) 125 is formed in the upstream tubular part 111.

Holes (water flow-accelerating holes 135) are formed by the adjacent columns 21 and 21, the outer peripheral surface of the bubble generating part 131, and the inner peripheral surface of the main body 121, and each of the holes has a cross-sectional area that gradually reduces along the side surfaces of the columns 21 and 21 from the upstream side toward the downstream side so that a water flow accelerates.

In the bubble generator 100 having such a structure as described above, vacuum areas are formed downstream from the water flow hole 133 of the base 130 and from the recesses 25 of the columns 21, and microbubbles are generated in the vacuum areas.

Figure 19:
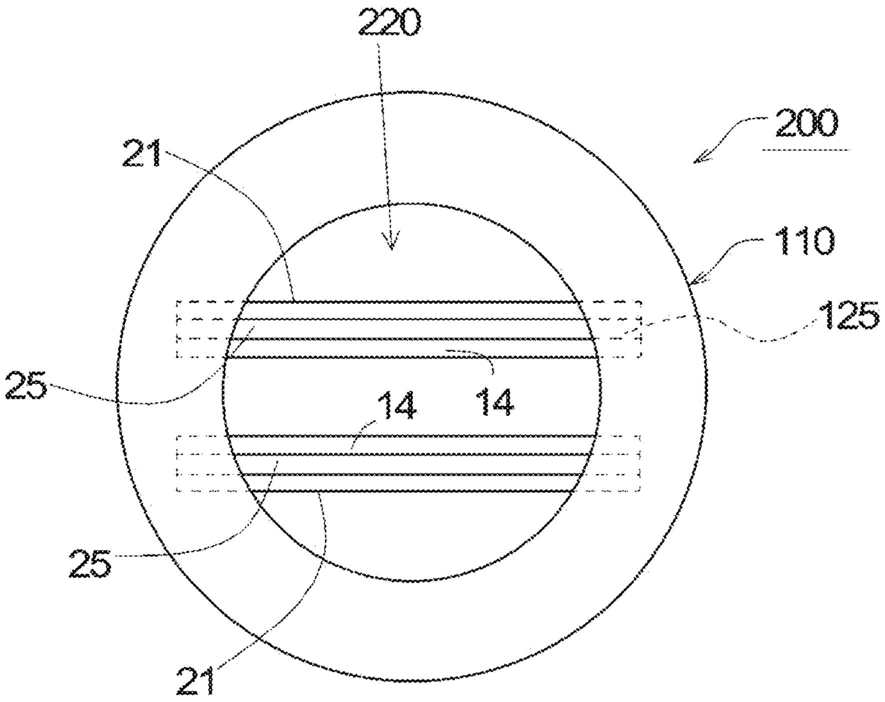
FIG. 19 is a plan view viewed from a downstream side, which shows the structure of a bubble generator according to another embodiment of the present disclosure.

FIG. 19 shows a bubble generator 200 as another example. It is to be noted that in FIG. 19, the same components as those shown in FIG. 18 are denoted by the same reference signs, and the description thereof will not be repeated.

The bubble generator 200 includes a tubular main body 110 and a bubble generating part 220, and the bubble generating part 220 has a structure in which columns 21 are suspended in the through hole of the main body 110.

In the bubble generator 200 having such a structure as described above, a recess 25 is formed in the back surface of each of the columns 21. Therefore, when passing between the columns 21 and reaching the back surface of the columns 21, a water flow is sucked into the recesses 25, and therefore the flow velocity of the water flow increases so that a high vacuum is produced. As a result, vacuum areas are created downstream from the columns 21, and microbubbles are generated in the vacuum areas.

Figure 20:
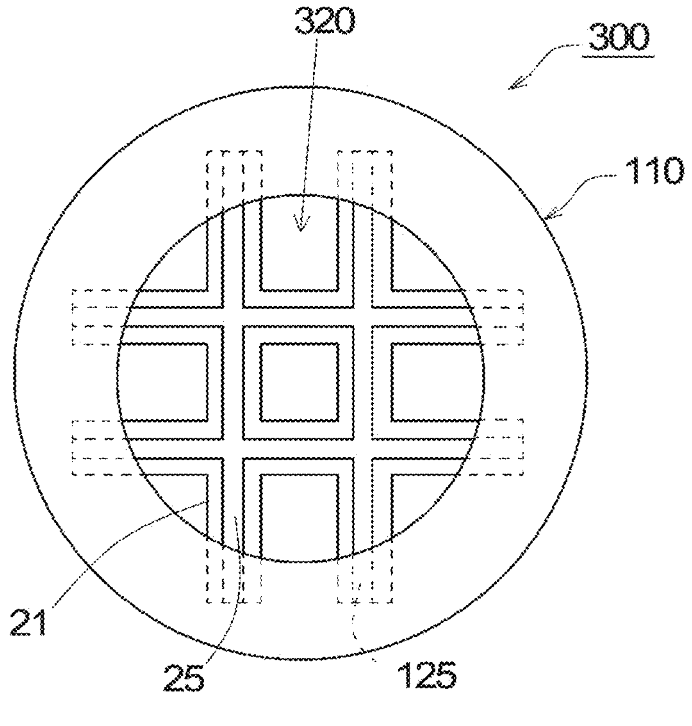
FIG. 20 is a plan view viewed from a downstream side, which shows the structure of a bubble generator according to another embodiment of the present disclosure.

FIG. 20 shows a bubble generator 300 as another example. It is to be noted that in FIG. 20, the same components as those shown in FIG. 19 are denoted by the same reference signs, and the description thereof will not be repeated.

The bubble generator 300 includes a tubular main body 110 and a bubble generating part 320. The bubble generating part 320 has a structure in which columns 21 are arranged in a grid pattern.

In the bubble generator 300, as in the case shown in FIG. 19, vacuum areas are created downstream from the columns 21, and microbubbles are generated in the vacuum areas.

The examples shown in FIGS. 19 and 20 use the columns 21 having a V-shaped cross section shown in FIG. 15B, but may use the columns having another structure shown in FIGS. 14 to 17.

These columns may be supported in a cantilevered state in a conventional manner such that their free ends are opposed to each other.

Hereinbelow, an example of the present disclosure will be described.

Figure 21:
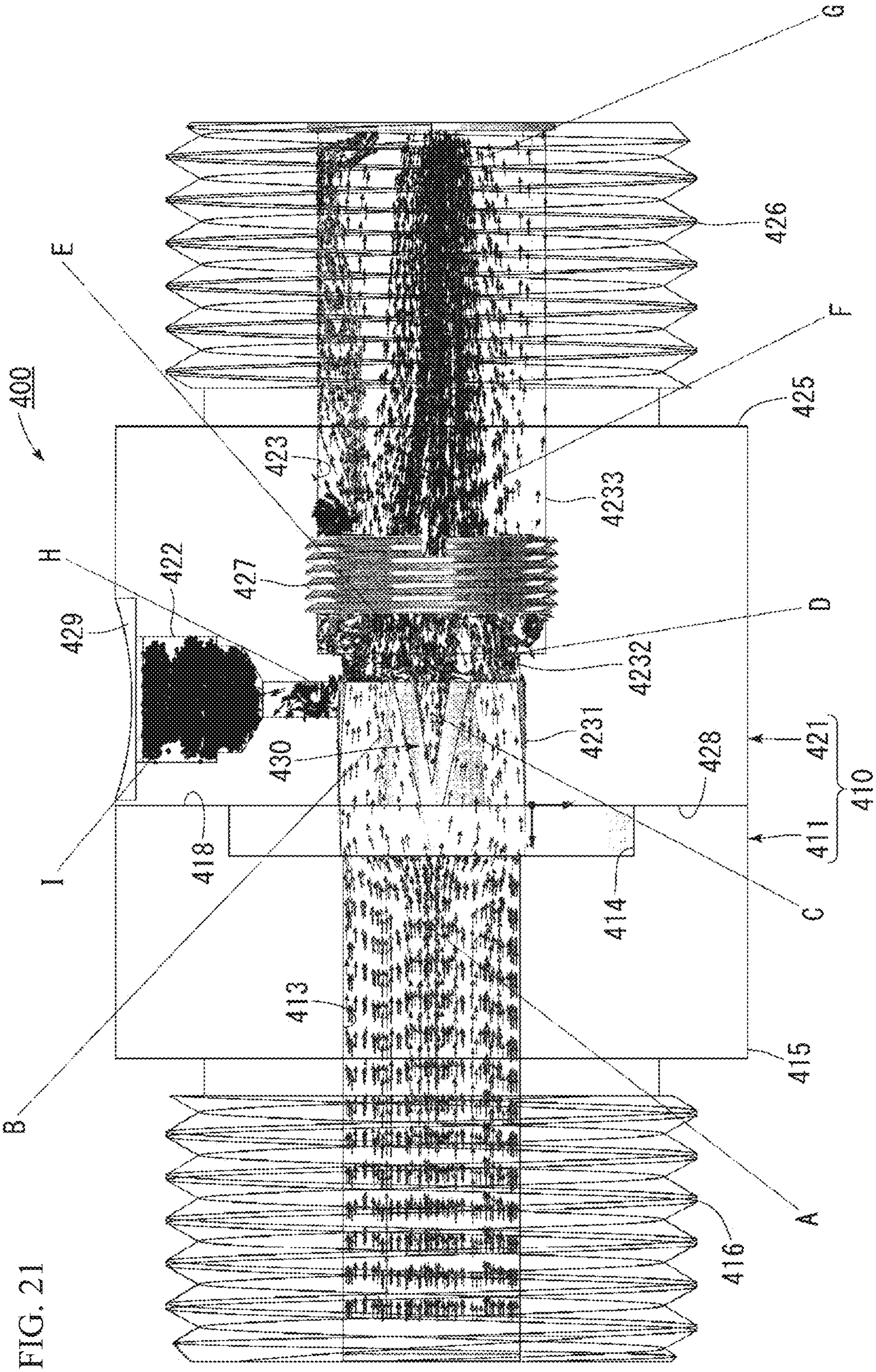
FIG. 21 is a longitudinal sectional view showing the structure of a bubble generator according to an example of the present disclosure.

FIG. 21 shows the structure of a bubble generator 400 according to the example.

The bubble generator 400 according to the example includes a main body 410 and a bubble generating part 430.

The main body 400 is divided into an upstream tubular part 411 and a downstream tubular part 421, and both of them are bonded together at their abutting surfaces.

The upstream tubular part 411 includes a base 415 and a joint 416, and a downstream-side facing surface 418 of the base 415 is bonded to an upstream-side facing surface 428 of the downstream tubular part 421. The downstream-side facing surface 418 has a first recess 414 provided around a first through hole 413. The joint 416 has a threaded outer periphery, and therefore can be exclusively connected to a water supply pipe.

The downstream-side tubular part 421 includes a base 425 and a joint 426. The base 425 has the same diameter as the base 415 of the upstream tubular part 411. The joint 426 has a threaded outer periphery so as to be easily connected to a water supply pipe or the like.

The downstream tubular part 421 has a second through hole 432, and the second through hole 423 includes, from the upstream side, a bubble generating part receiver 4231, a bubble generating part regulator 4232, and an outlet 4233. The inner diameter of the bubble generating part receiver 4231 is the same as the outer diameter dimension of the bubble generating part 430, and therefore the bubble generating part 430 is liquid-tightly inserted into the receiver 4231 by interference fitting. The inner diameter of the bubble generating part regulator 4232 is slightly smaller than the outer diameter of the bubble generating part 430, and therefore the bubble generating part regulator 4232 serves as a stopper for the bubble generating part 430. The outlet 4233 has an inner diameter larger than that of the bubble generating part receiver 4231, and the inner periphery of the outlet 4233 has a screw thread 427. Therefore, a pipe having a threaded tip can be inserted into the outlet 4233 and threadedly engaged with the screw thread 427. In this case, the volume or shape of a space located downstream from the bubble generating part 430 can be adjusted by adjusting the position of tip of the pipe. A cavitation effect may be enhanced by adjusting such a volume or shape. Even when the pipe is not inserted, the screw thread 427 interferes with a water flow flowing downstream from the bubble generating part 430, which may influence and enhance a cavitation effect.

An air vent 422 is provided between the outer peripheral surface of the base 425 of the downstream tubular part 421 and the bubble generating part receiver 4231 of the second through hole 423. The diameter of the air vent 422 gradually increases from the second through hole 423 side toward the outer peripheral surface side. In this example, the air vent 422 is closed by a lid 429 on the outer peripheral surface.

Figure 22:
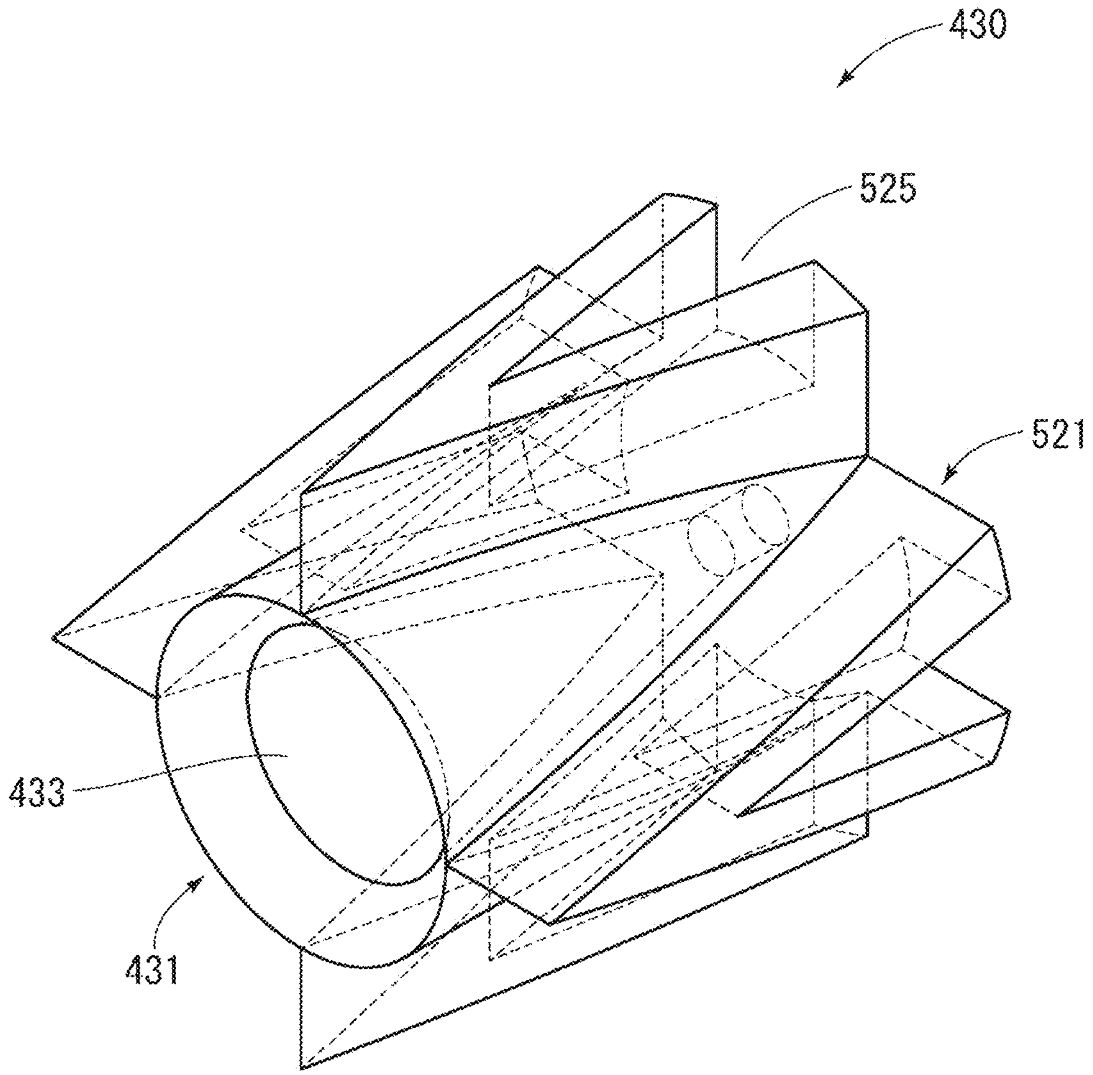
FIG. 22 is a perspective view of a bubble generating part of the bubble generator shown in FIG. 21.
Figure 23:
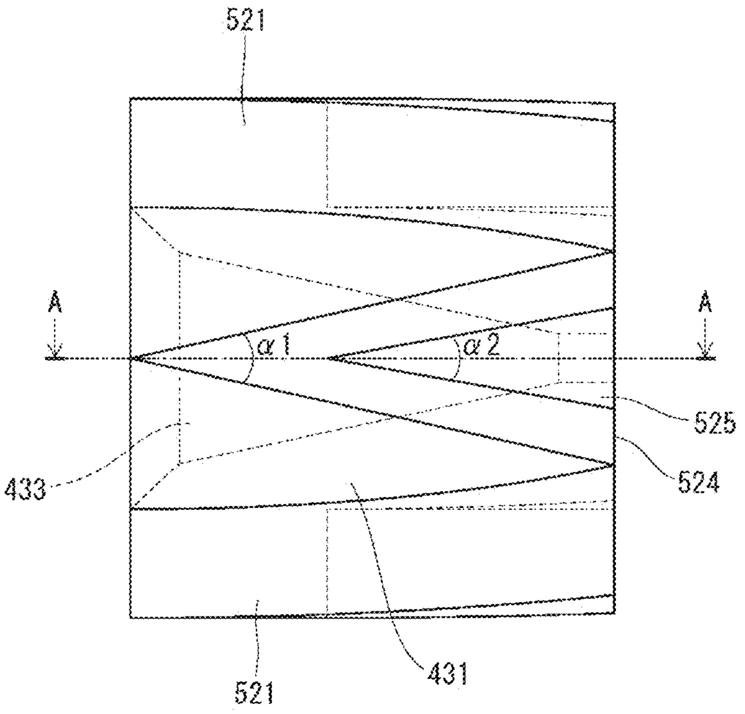
FIG. 23 is a side view of the bubble generating part shown in FIG. 22.
Figure 24:
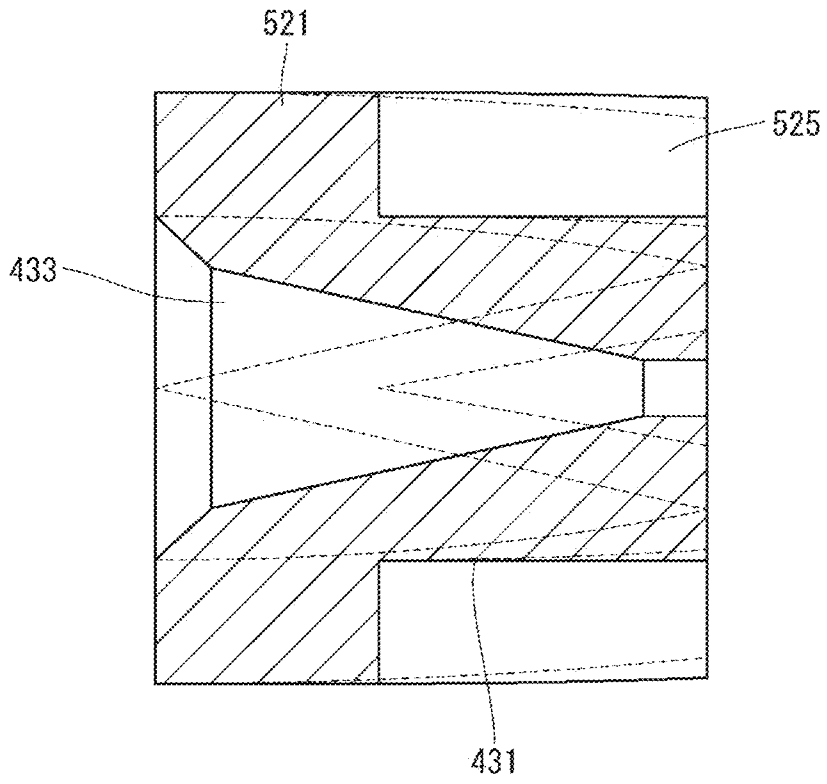
FIG. 24 is a sectional view taken along a line A-A in FIG. 23.

FIGS. 22 to 24 show the structure of the bubble generating part 430.

The bubble generating part 430 includes a tubular base 431 and columns 521 evenly arranged on the outer periphery of the base 431.

The base 431 has a tapered water flow hole 433 whose diameter gradually reduces.

As shown in FIG. 23, each of the columns 521 has a V shape in a plan view. The included angle α1 of the inclined surfaces of each of the columns 521 is about 25 degrees, and the included angle α2 of peripheral walls of a recess 525 is about 20 degrees. These included angles may be the same. The tip of each of the columns 521 coincides with the upstream-side end of the base 431, and a bottom surface 524 of each of the columns 521 coincides with the downstream-side end of the base 431.

The four columns 521 are the same in dimensions, and are evenly distributed around the base 431. This allows the center of the recesses 525 provided in the back surfaces of the columns 521 to be located at the same position as the outlet of the water flow hole 433 of the base 431 (in the water flow direction), and allows the recesses 525 to be evenly distributed around the outlet.

The air vent 422 communicates with the recess 525 of one of the columns 521.

The simulation results of pressures at positions A to I in the bubble generator 400 having such a structure as described above are as follows.

A: 0.486 MPa
B: 0.408 MPa
C: 0.004 MPa
D: 0.032 MPa
E: 0.051 MPa
F: 0.006 MPa
G: 0.008 MPa
H: 0.004 MPa
I: 0.004 MPa

As can be seen from the above results, vacuum areas are created in a wide range located downstream from the bubble generating part 430. In the vacuum areas, the pressure of supplied tap water is reduced to about 1/1000, and therefore a high cavitation effect is exerted.

The present disclosure is not limited to the above description of the embodiments and examples according to the present disclosure. Various modified embodiments are also included in the present disclosure as long as they are easily conceivable by those skilled in the art and do not depart from the scope of the claims.

The following is disclosed.

(A) A bubble generator including: a tubular main body; and a bubble generating part that includes a column protruding into the tubular main body and that generates microbubbles in a water flow passing through the main body, wherein the column has a water flow-facing surface that directly faces the water flow and a vacuum-producing surface that is located on a back side of the water flow-facing surface, and the vacuum-producing surface has a recess.

(B) A bubble generator including: a tubular main body; and a bubble generating part that includes a column protruding into the tubular main body and that generates microbubbles in a water flow passing through the main body, wherein in a cross section perpendicular to an axis of the column, a water flow-facing surface forms an arc, a string connecting both ends of the arc corresponds to a vacuum-producing surface, and the arc is tilted with respect to a direction of the water flow.

(C) A bubble generator including: a tubular main body; and a bubble generating part that includes a column protruding into the main body and that generates microbubbles in a water flow passing through the main body, wherein the column has a water flow-facing surface that directly faces the water flow and a vacuum-producing surface that is located on a back side of the water flow-facing surface, and one of edges of the vacuum-producing surface is located upstream from another edge of the vacuum-producing surface.

(1) A bubble generator including: a tubular main body; and a bubble generating part provided in the main body, wherein the bubble generating part includes: a base having a water flow hole whose diameter reduces along a direction of a water flow; and a plurality of columns that connect the base and an inner peripheral surface of the main body, and each of the columns has a recess on its back side in the water flow direction.

(2) The bubble generator according to (1), wherein each of the columns has inclined water flow-facing surfaces that face the water flow, and the recess is provided in a back surface of each of the columns in the water flow direction and has wall surfaces parallel to the water flow-facing surfaces.

(3) The bubble generator according to (2), wherein each of the columns has a cross section whose shape along the water flow is a V shape whose diameter increases along the water flow.

(4) The bubble generator according to (3), wherein the three to five columns are provided around the base, and an included angle of the V shape is 15 to 35 degrees.

(5) The bubble generator according to (3) or (4), wherein a tip of V shape of each of the columns is located at an upstream-side end of the base with respect to the water flow, and an open end of V shape of each of the columns is located at a downstream-side end of the base with respect to the water flow.

(6) The bubble generator according to any one of (1) to (5), wherein the columns are evenly arranged around the base, and centers of the recesses provided in the back surfaces of the columns are located on imaginary lines radially extending from a center of the outlet of the water flow hole in a direction orthogonal to the water flow.

(7) The bubble generator according to any one of (1) to (6), wherein a center line of the water flow hole of the base coincides with a center line of the tubular main body.

(8) The bubble generator according to any one of (1) to (7), wherein an air vent is provided which allows an outer surface of the tubular main body and the recess of the column to communicate with each other.

(9) The bubble generator according to (8), wherein the air vent is provided between the recess of one of the columns and the outer surface of the main body.

(10) The bubble generator according to any one of (1) to (9), wherein the inner peripheral surface of the main body has a projection provided between an outlet of the main body and the bubble generating part in a circumferential direction.

(11) The bubble generator according to (10), wherein the inner peripheral surface of the main body has a screw thread formed between the outlet of the main body and the bubble generating part.

(12) The bubble generator according to any one of (1) to (11), wherein the main body includes an upstream tubular part having a first through hole and a downstream tubular part having a second through hole, and the upstream tubular part has a downstream-side facing surface having a first recess whose diameter is larger than that of the bubble generating part formed around the first through hole, and part of the main body is hermetically inserted into the second through hole of the downstream tubular part, and a remaining part of the main body is inserted into the first recess so that a tip portion thereof faces the first through hole.

(13) The bubble generator according to (12), wherein the downstream tubular part has a hole formed to allow an outer surface of the downstream tubular part and the second through hole to communicate with each other.

(14) A bubble generator including: a tubular main body; and a bubble generating part provided in the main body, wherein the bubble generating part includes: a tubular base provided concentrically with the main body and having an inner peripheral surface whose diameter reduces along a water flow direction; a plurality of water flow-accelerating holes provided on an outer peripheral surface of the base so as to be reduced in diameter along the water flow direction; and a plurality of separating walls that separate the water flow-accelerating holes, the separating walls each having a recess formed on a back surface side thereof in the water flow direction.

REFERENCE SIGNS LIST

1000, 1500 Bubble generator
1100 Main body
1200 Bubble generating part
1210, 1710 Column
1215, 1715 Ridgeline
1220 Recess
1300 Slit
1310 Edge of slit
2000, 3000 Bubble generating unit
2100, 3100 Housing
2110, 3110 Orifice
10, 11, 18, 20, 21, 28, 30, 31, 38, 521 Column
15, 16, 17, 25, 25', 35, 525 Recess
100, 200, 300, 400 Bubble generator
110, 410 Main body
130, 220, 320, 430 Bubble generating part
133, 433 Water flow hole
111, 411 Upstream tubular part
121, 421 Downstream tubular part
422 Air vent

The invention claimed is:

1. A bubble generator comprising:

a tubular main body, and a bubble generating part in the tubular main body that generates microbubbles in a water flow passing through the tubular main body, wherein the bubble generating part has a flow-facing surface that faces the water flow and a vacuum-producing surface that is located on a back side of the flow-facing surface, and the vacuum-producing surface has at least one recess formed therein, wherein the recess comprises an undersurface which prevents the recess from directly communicating and penetrating through to the flow-facing surface.

2. The bubble generator of claim 1, wherein the bubble generating part includes at least one column protruded from an inner surface of the tubular main body, and wherein the column has the flow-facing surface and the vacuum-producing surface.

3. The bubble generator of claim 2, wherein the bubble generating part comprises multiple columns protruded from the inner surface of the tubular main body.

4. The bubble generator of claim 1, wherein an edge of the vacuum-producing surface is located further upstream along an axis of the column relative to the water flow than another edge of the vacuum-producing surface.

5. The bubble generator of claim 1, wherein the recess has an arc or V shape in a longitudinal cross-section of the column.

6. The bubble generator of claim 1, wherein the vacuum-producing surface has more than one recess formed therein.

7. A bubble generator comprising:

a tubular main body, and a bubble generating part in the tubular main body that generates microbubbles in a water flow passing through the tubular main body, wherein the bubble generating part has a flow-facing surface that faces the water flow and a vacuum-producing surface that is located on a back side of the flow-facing surface, and the vacuum-producing surface has at least one recess formed therein, wherein the bubble generating part includes at least one column protruded from an inner surface of the tubular main body, and the column has the flow-facing surface and the vacuum-producing surface, wherein the flow-facing surface of the column has a shape that increases in size along an axis of the column in extending toward the vacuum-producing surface of the column.

8. The bubble generator of claim 3, wherein the shape of the flow-facing surface forms an arc or V shape in a longitudinal cross-section of the column.

9. The bubble generator of claim 8, wherein an edge of the vacuum-producing surface is located further upstream along the axis of the column relative to the water flow than another edge of the vacuum-producing surface.

10. The bubble generator of claim 8, wherein the flow-facing surface forms the arc shape, and the arc shape has a semicircular profile.

11. The bubble generator of claim 8, wherein the flow-facing surface forms the V shape, and the V shape has an included angle between 10° and 35°.

12. The bubble generator of claim 11, wherein the included angle is between 20° and 35°.

13. The bubble generator of claim 12, wherein the included angle is 25°.

14. The bubble generator of claim 7, wherein the shape of the flow-facing surface forms a trapezoid shape in a longitudinal cross-section of the column.

15. The bubble generator of claim 14, wherein the trapezoid shape has legs of either equal or unequal length.

16. The bubble generator of claim 15, wherein the trapezoid shape has legs of unequal length, and one of the legs is arranged parallel to the water flow.

17. The bubble generator of claim 7, wherein the bubble generating part comprises multiple columns protruded from the inner surface of the tubular main body.

18. The bubble generator of claim 7, wherein an edge of the vacuum-producing surface is located further upstream along an axis of the column relative to the water flow than another edge of the vacuum-producing surface.

19. The bubble generator of claim 7, wherein the recess has an arc or V shape in a longitudinal cross-section of the column.

20. The bubble generator of claim 7, wherein the vacuum-producing surface has more than one recess formed therein.

* * * * *